(12) United States Patent
Chretien et al.

(10) Patent No.: US 6,864,473 B2
(45) Date of Patent: Mar. 8, 2005

(54) DYNAMIC OPTICAL FILTRATION

(75) Inventors: Jean-Loup Chretien, Leagaue City, TX (US); Edward T. Lu, Houston, TX (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 342 days.

(21) Appl. No.: 09/988,855

(22) Filed: Dec. 7, 2000

(65) Prior Publication Data

US 2002/0071185 A1 Jun. 13, 2002

(51) Int. Cl.[7] .................................................. G01J 1/20
(52) U.S. Cl. ..................................... 250/201.1; 349/13
(58) Field of Search ............................. 250/201.1, 204, 250/206, 229; 349/13, 14; 351/44, 45; 396/276; 359/738

(56) References Cited

U.S. PATENT DOCUMENTS

| | | | |
|---|---|---|---|
| 3,961,181 A | 6/1976 | Golden | 250/208 |
| 4,018,532 A | 4/1977 | Fletcher et al. | 356/141 |
| 4,146,784 A | 3/1979 | Yekutieli | 250/203 R |
| 4,462,661 A | * 7/1984 | Witt | 349/14 |
| 4,491,390 A | 1/1985 | Tong-Shen | 350/331 R |
| 4,641,922 A | 2/1987 | Jacob | 350/331 R |
| 4,848,890 A | * 7/1989 | Horn | 351/44 |
| 4,892,394 A | 1/1990 | Bidabad | 350/357 |
| 4,999,483 A | 3/1991 | Okamoto | 250/203.1 |
| 5,258,607 A | 11/1993 | Agostini et al. | 250/201.1 |
| 5,298,732 A | 3/1994 | Chen | 250/203.4 |
| 5,305,012 A | 4/1994 | Faris | 345/7 |
| 5,541,705 A | * 7/1996 | Kan et al. | 396/233 |
| 5,671,035 A | * 9/1997 | Barnes | 351/45 |
| 5,714,751 A | 2/1998 | Chen | 250/203.4 |
| 5,841,507 A | 11/1998 | Barnes | 351/49 |
| 5,844,721 A | 12/1998 | Karpen | 359/603 |
| 6,244,703 B1 | * 6/2001 | Resnikoff et al. | 351/44 |

* cited by examiner

Primary Examiner—Thanh X. Luu
(74) Attorney, Agent, or Firm—Theodore U. Ro

(57) ABSTRACT

A dynamic optical filtration system and method effectively blocks bright light sources without impairing view of the remainder of the scene. A sensor measures light intensity and position so that selected cells of a shading matrix may interrupt the view of the bright light source by a receptor. A beamsplitter may be used so that the sensor may be located away from the receptor. The shading matrix may also be replaced by a digital micromirror device, which selectively sends image data to the receptor.

15 Claims, 22 Drawing Sheets

DYNAMIC OPTICAL FILTRATION

ORIGIN OF THE INVENTION

The invention described herein was made by employee(s) of the United States Government and Other(s) and may be manufactured and used by or for the Government of the United States of America for governmental purposes without the payment of any royalties thereon or therefore.

BACKGROUND

This invention relates generally to optical devices and, more particularly, to systems and methods for filtering bright light sources for use with optical devices.

Vision is affected by the amount of light illuminating the various objects in our view. By flipping a switch, for example, the contents of a dark room become immediately ascertainable. Eyes are thus light-processing organs.

The human eye includes several features for processing light. Muscles in the iris allow the pupil to open and close, regulating the amount of light received by the retina. Receptors on the surface of the retina become desensitized in response to bright-light ambients. The eyelids may "squint" the eye, for more effective viewing of a scene.

Other optical devices emulate the human eye. Photographic cameras, for example, typically include a diaphragm comprising a circular hole through which light may pass. Like the iris, the diaphragm adjusts the size of the hole, as needed, to regulate the amount of light received onto the film of the camera. A shutter blocks light, similar to the eyelids. Video cameras, binoculars and other optical devices may include similar features.

Where very bright light sources interrupt a view of a scene, the eyelids may naturally react by squinting. However, the viewable scene in such circumstances may be severely impaired. In some situations, such as operating a motor vehicle at sunrise or sunset, avoiding lasers fired by enemy aircraft, or taking off or landing an airplane, such visual impairment may even be dangerous.

Traditionally, bright sources may be compensated for by using a filtration system. A filter may be added to the optical device to impede some of light from reaching the eye or receptor. Sunglasses and helmet visors, for example, may include ultraviolet (UV) filters to prevent part of the visible light spectrum from reaching the eye. Filters may also be added to cameras, for use in bright light environments. Filtration systems, however, may block not just the bright source, but other light sources in the scene, affecting the visibility of remaining images. In conditions of high contrast, that is, where bright light is contrasted by a dark environment, the surrounding dark environment may be quite difficult or even impossible to perceive using the filtration system.

Alternatively, a bright light source may be blocked entirely from view. Automobile visors may be used for this purpose. Such blocking systems typically impair the view of other objects. For example, in response to a very bright light source, such as a loser beam, the variable iris of a camera may close entirely. The receptor of the camera may be protected from damage, but, during this time, the receptor is also blinded.

Many of the prior art solutions require the receptor to stay in one position, are slow to respond to a bright light source, or block more than the bright source, impeding view of the remaining scene. Thus, there is a continuing need for a dynamic filtration device that may more effectively block bright light sources, yet allow a clear visual image to be received.

SUMMARY

According to one embodiment of the present invention, a method for effectively blocking bright light sources comprises deflecting incident light of an image from a receptor to a sensor, producing sensor information, and shading one or more elements of a shading matrix based upon the sensor information.

In another embodiment, a system comprises a deflector to redirect incident light from a scene, a sensor to receive the incident light, a shading matrix comprising a plurality of elements, wherein each of the elements may selectively be shaded, and a controller coupled to the shading matrix, wherein the controller receives information about the intensity of the redirected incident light from the sensor and selectively shades one or more elements of the shading matrix based upon the information.

Advantages and other features of the invention will become apparent from the following description, the drawings, and the claims.

DETAILED DESCRIPTION

Figure 1:
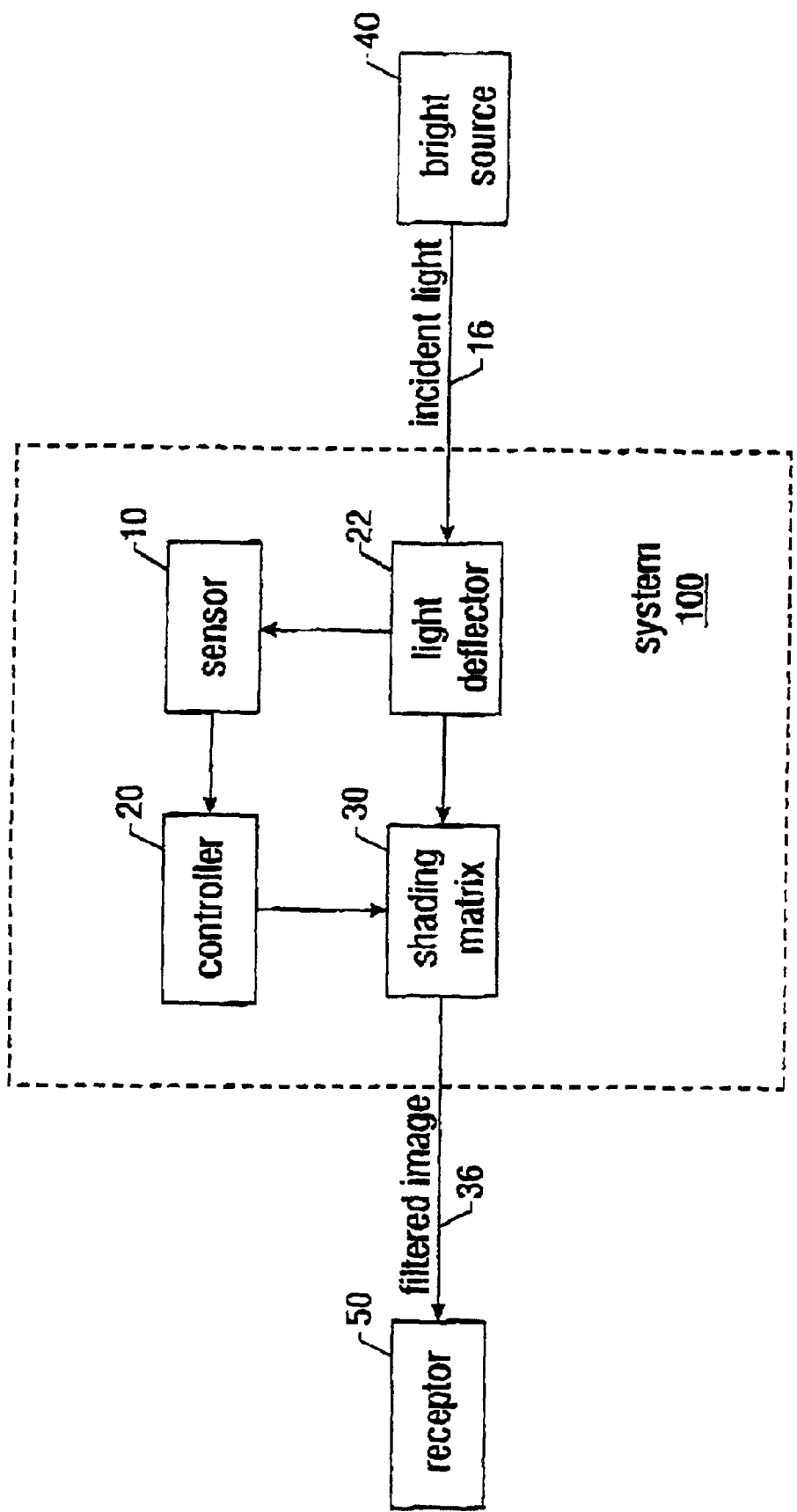
FIG. 1 is a block diagram of a system according to one embodiment of the invention.

According to the several embodiments of the invention described herein, a dynamic filtration system and method effectively blocks bright light sources without impairing view of the remainder of the scene. In one embodiment, the system employs a sensor to measure light intensity, a controller to process the measured information, and a shading matrix comprising a plurality of individually controllable cells. The cells of the shading matrix located between a bright light source and a receptor may be shaded such that the bright light does not reach the receptor.

The filtration system further includes a mechanism, such as a beamsplitter, for deflecting the incoming light to the sensor. The beamsplitter allows the sensor to be placed in a location remote to the receptor. The shading matrix may comprise a variety of dynamic materials, such as liquid crystal display media.

In another embodiment, the system employs a digital micromirror device, instead of a shading matrix, to "deflect" bright light sources from being received by the receptor. In yet another embodiment, the digital micromirror device may be used as both a beamsplitter and a light deflector. These embodiments and more are explained in detail, below.

The dynamic filtration systems described herein may include features to address environmental considerations, such as the parallax effect, which results from two eyes seeing a source differently, as well as an electronic phenomenon that may emulate the Larsen, or feedback, effect, of audio hardware. In some embodiments, the systems may be enhanced to track and compensate for changes in eye or head position, for more precision-oriented applications.

As explained in the Background, bright light sources may be blocked or filtered such that the receptor may more effectively view a scene. Another solution may be to selectively combine filtration with blocking of the bright light source. For example, a controllable matrix, such as a liquid crystal display (LCD) medium, comprising a large number of individual cells, may be used as a filtration screen, to be placed between the bright light source and the receptors, such as the eyes. A sensor may detect the bright source, invoke a driver or other intelligent mechanism, and selectively bias the voltage of some of the individual cells such that they are variably darkened or made opaque. The darkened or opaque cells partially or totally block the offending bright light source from reaching the receptors. The matrix is thus a dynamic filtration device.

Ideally, the sensor is positioned to receive the same incident light as received by the receptors. In the case of human eye receptors, the sensor may thus be positioned very near the eyes. The sensors may be part of eyeglasses worn by an individual, placed upon a helmet, or otherwise attached "close" to the head. In some environments, however, the additional sensor hardware may be visually disruptive. Wherever the sensor is located, its position relative to the receptors may be accounted for in calculating where best to block the bright light source.

In the embodiment of FIG. 1, a system 100 includes a sensor 10, for receiving incident light 16 from a bright light source 40. The sensor 10 measures the intensity and the position of the incident light 16 for the system 100. The sensor 10 may thus include any media that may receive light and evoke a response that measures the light.

For example, the sensor 10 may comprise a panel of photoreceptor cells. Photoreceptors respond to incoming light by producing a voltage. In an array or panel of photoreceptors, each cell may correspond to a portion of the incoming light.

In one embodiment, the sensor 10 is a digital camera. The photoreceptors may be charge coupled devices (CCD). A digital camera uses an electronic device instead of film to record an image. The electronic device comprises arrays of photoreceptor cells that emit electrons in response to incoming light. The "picture" is "taken" by recording the electronic response in each photoreceptor cell. The photoreceptor cells are then "emptied," such as to a memory, so that the camera can take a new picture. The digital camera may be a photographic (snapshot) camera or a video camera, as examples.

When a photograph is taken with a standard camera, light reflected from the viewed image is received by a film or plate that is sensitized by the light to produce a reverse image of the viewed scene. Likewise, according to one embodiment, the sensor 10 of the system 100 receives a view of the scene at a given point in time and produces information, such as a voltage, that is representative of the image.

In FIG. 1, the information is sent from the sensor 10 to a controller 20. The controller 20 determines, based upon the received information, which cells of a shading matrix 30, are to be modified, in order to effectively block or modify the bright light source 40 from the receptor 50.

In one embodiment, the controller 20 is a processor-based system that includes a microprocessor and a memory for storing driver or software programs. In this context, the term "processor" may generally refer to one or more microprocessors, such as a microcontroller, a state of the art microprocessor, or a digital signal processor, as just a few examples.

The memory may be volatile, such as a static random access memory (SEAM) or dynamic RAM (DRAM), or may be non-volatile, such as a read-only memory (ROM), a programmable ROM (PROM), or may include media such as a hard disk drive or compact disk ROM (CDROM), for permanent storage of software in the controller 20. The controller 20 further may be a computer system such as, for example, a laptop computer to receive the data from the sensor 10, or may be implemented wholly in hardware using discrete logic.

In FIG. 1, the controller 20 is coupled to the shading matrix or filter 30. In one embodiment, the shading matrix 30 is a two-dimensional light transmissive liquid crystal display (LCD) matrix. The transmissive LCD matrix comprises a plurality of individual cells, each of which may be separately modified by the controller 20. The liquid crystal cells may be positioned between two pieces of glass, plastic or other rigid transparent material.

When the controller 20 receives the information about the bright light source 40 from the sensor 10, the particular cells of the shading matrix 30 which are between the receptors 50 and the bright source 40 are shaded. In other words, the opacity of the cells corresponding to the bright light source 40 is increased. The remaining cells of the shading matrix 30 remain transparent. The shading matrix 30 thus effectively filters only the bright source from view, such that the quality of the remainder of the image may be maintained. Likewise, once the bright light source 40 is no longer in view, the cells which were rendered opaque may be returned to a transparent state.

The opacity of each cell may be controlled electrically. Each cell individually and distinctly responds to voltage. For example, with LCD cells, where no voltage is applied to the cell, the cell remains transparent. As soon as a voltage is applied to the cell, however, incident light 16 received by the cell is scattered. The cell itself is milky or opaque. Although the cell remains transmissive, e.g., light passes through it, the cell shades the incident light 16 from the receptor 50 on the other side of the liquid crystal display matrix.

In some embodiments, the voltage is adjustable. The voltage may be increased such that light passing through the cell is more scattered, e.g. the cell is more opaque, less transmissive. The LCD matrix may be replaced with other electrochromic techniques for diffusing light through the individual cells or otherwise shading the cells of the matrix.

A variety of factors may influence the position of the shading matrix 30 with respect to the receptor 50. For example, the focal length of the receptor 50, the nature of the receptor 50, the field of view, and so on may be considered when positioning the shading matrix 30. Typically, however, the shading matrix 30 may be placed in a position just before the focal length of the receptor 50.

Practically speaking, the system 100 may be used with receptors which include electronic and non-electronic photo and video cameras, binoculars, visors, night vision systems, and other optical devices as well.

Figure 2:
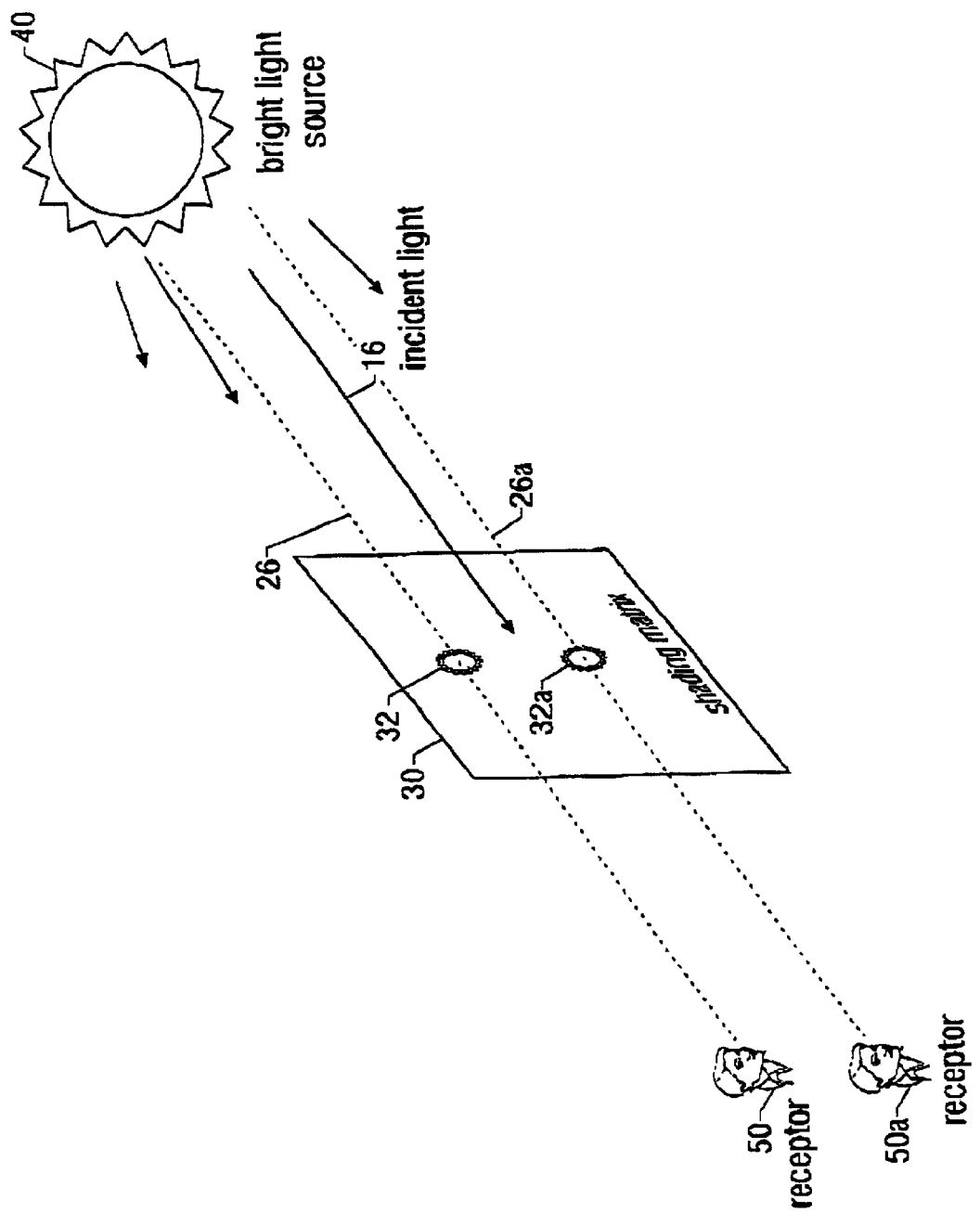
FIG. 2 is a second block diagram the system according to one embodiment of the invention.

FIG. 2 illustrates the operation of the shading matrix 30 of the system 100, according to one embodiment. The receptor 50 is a pair of human eyes and the bright light source 40 is the sun. The shading matrix 30 is positioned between the receptor 50 and the bright light source 40. As in FIG. 1, incident light 16 is received from the bright light source 40, through the shading matrix 30, to be received by the receptor 50.

A dark image 32 is shown on the shading matrix 30. When the dark spot 32 is appropriately positioned, the bright source 40 is shaded from the view of the receptor 50. In one embodiment, the amount of shading or blocking of the bright light source 40 is adjustable. Thus, the receptor 50 may clearly view the remainder of the scene, unimpeded by the bright light source 40.

In some embodiments, the position of the receptor 50 may be analyzed to improve the active filtration of the shading matrix 30. Where the bright light source 40 is effectively shaded, the receptors 50 may not need to react, such as by closing the iris or diaphragm. The visibility and contrast of the remaining scene may thus be greatly improved where the bright source 40 would otherwise impair the field of view.

For example, an imaginary line 26 connects the bright light source 40 and the receptor 50 in FIG. 2. The imaginary line 26 may be used to position the dark spot 32 on the matrix 30. Ideally, the dark spot 32 is positioned where the line 26 intersects the shading matrix 30.

The receptor 50, however, may move to the position indicated at 50a. Then, the dark spot 32 does not block the bright light source 40 from the view of the receptor 50a. Thus, according to one embodiment, a new line 26a may be calculated between the bright light source 40 and the receptor 50a, such that a new dark spot 32a may be generated on the shading matrix 30. Some techniques for detecting motion of the receptor 50 are discussed further, below.

Looking back to FIG. 1, in some embodiments, the controller 20 thus accounts for the movement of the receptor 50 and dynamically updates the shading matrix 30. As discussed in further detail, below, the system 100 may include additional sensors for monitoring the receptor 50.

Ideally, the sensor 10 is positioned such that it may receive the some incident light 16 that is intended for the receptor 50. Thus, in some prior art systems, the sensor 10 is positioned as close to the receptor 50 as possible. This minimizes the adjustments of the dark regions 32 of the shading matrix 30 to be made by the controller 20. However, the position of the sensor 10 may adversely affect the view of the scene by the receptor 50.

Thus, according to the embodiment of FIG. 1, the system 100 further includes a light deflector 22 that may receive incident light 16 from the bright light source 40 and send a portion of it to the sensor 10. the remainder of the incident light 16 passes through the light deflector 22 to the shading matrix 30, as shown in FIG. 1. The light deflector 22 permits the sensor 10 to be in a more remote location relative to the receptor 50, yet receive the same incident light 16 that is received by the receptor 50.

In one embodiment, the light deflector 22 is a beamsplitter. The beamsplitter typically permits a large percentage of the incident light 16 to pass through the beamsplitter, while only a portion of the incident light 16 is deflected in another direction. For example, in one embodiment, a 90/10 beamsplitter is employed in the system 100. In this configuration, 90% of the incident light 16 passes through the beamsplitter to be received by the receptor 50. The remaining 10% of the incident light 16 is received by the sensor 10.

The system 100 may be used on or with a variety of optical devices such as cameras, video cameras and the like. For example, in FIG. 3A, the system 100 may be part of an attachment 200, such as may be added to the front of a camera 56. In this embodiment, the light deflector 22 is a beamsplitter 22a. The beamsplitter 22a may be a cube-shaped or a planar device, for example, for receiving the incident light 16.

As described above, the beamsplitter 22a receives incident light 16 and deflects a portion of that light as deflected light 18, to be received by the sensor 10. The sensor 10 is located on a secondary image plane while the shading matrix 30 is positioned on a primary image plane. The sensor 10 is symetrical of primary image plane relative to beam splitter 22a. The controller, among other tasks, will take in account the fact that the image seen by the sensor 10 is reversed after reflection on beamsplitter. In one embodiment, the shading matrix 30 is located such that the image received is in perfect focus, as illustrated by the converging lines in FIG. 3A. In this embodiment, it has been noted that the optical characteristics of the LCD matrix are nominal, such as almost no distortion is perceived. As the matrix is in focus as well as the observed landscape, it also allows to superimpose information on the matrix. This information can be driven by the controller, such as, text, symbols, synthetic images and so on. The remainder of the incident light 16 passes through the beamsplitter 22a to ultimately be received by the receptor 50.

The sensor 10 converts the incident light 16 to a quantifiable value, such as a voltage, and sends the data to the controller 20. The controller 20 then constructs a dark spot on the shading matrix 30 to block the bright light source 40 from the field of view of the receptor 50.

Figure 3A:
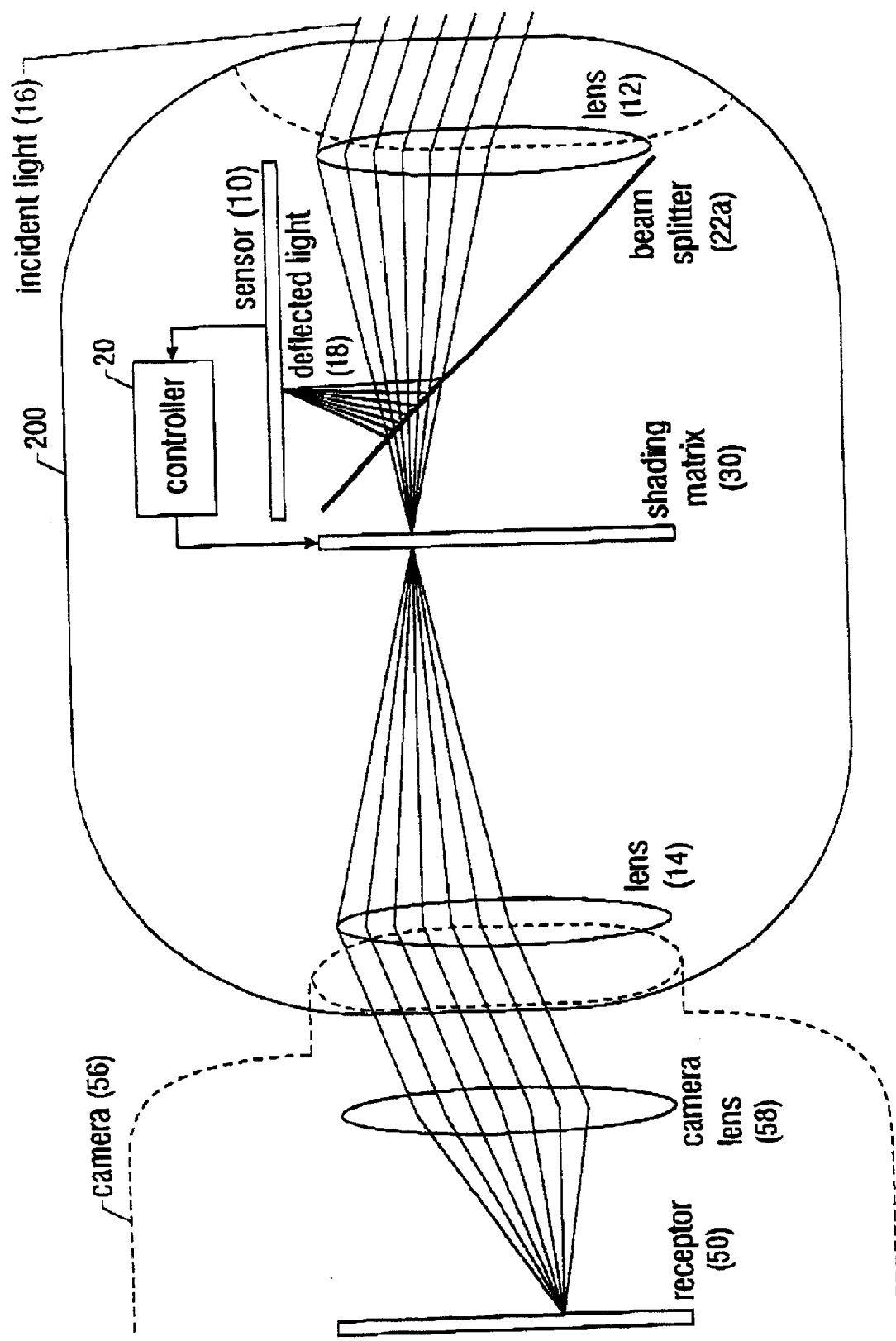
FIG. 3A is a diagram of an optical device employing the system of FIGS. 1 and 2 according to one embodiment of the invention.

The attachment 200 of FIG. 3A further includes two adjustable lenses, lens 12 and lens 14. The incident light 16 passes through the lens 12, where part of the light 16 is separated, as explained above. In one embodiment, the lens 12 may be moved to adapt the attachment 200 such that the object being imaged is in focus at the shading matrix 30. Likewise, the lens 14 may be moved to adapt the attachment 200 such that the object being imaged is in focus at the receptor 50. The receptor 50 may include photographic film, for example.

After a portion of the incident light 16 is deflected by the beamsplitter 22a, the remaining incident light 16 travels through the lens 14 to the camera 56. In one embodiment, the lenses 12 and 14 are symmetrical so that the optical characteristics of the incoming incident light 16 are restored after filtration.

In one embodiment, the shading matrix 30 is a transmissive LCD matrix, including a number of individual LCD units. Each unit consists of an electrically reactive substance which darkens or lightens in response to current. To be fully transmissive, the LCD matrix is ideally clear, like a pane of glass.

Unfortunately, some prior art LCD matrices are not optically ideal. That is, in some cases, the LCD matrix, although no current is driving any of the cells, may nevertheless not appear clear, as a pane of glass would be. In the attachment 200, the lens 12 may be positioned such that the incident light 16 reaches the shading matrix 30 in perfect focus, as shown by the converging lines of FIG. 3A. When the incident light 16 is bent by the lens 12 such that the focal point of an image reaches the LCD shading matrix 30, the cells of the shading matrix 30 do appear clear. This property of the LCD matrix may be preferred for attachments to be used with video and camera equipment, as well as with human eyes, binoculars, and other optical environments.

In another embodiment, a third lens (not shown) may be placed in front of the sensor 10. Depending on the position of the sensor 10, the third lens may be desirable so that the focal point of the deflected light 18 is at the sensor 10 such that the sensor 10 may fully receive the incoming scene.

The attachment 200 thus may comprise an independent compact device that may be attached to any optical system. Because the sensor 10 receives the same optical image received by the shading matrix 30, no zoom or other types of adjustments are necessary. Further, with proper adjustment of the lens 12, the image of the bright light source 40 may be in perfect focus at the shading matrix 30. Because the incident light 16 is not distorted or faded, the sensor 10 receives a clear, precise representation of the bright light source 40 according to one embodiment. This allows the controller 20 to likewise produce a precisely located dark spot 32 (not shown) on the shading matrix 30.

Because most cameras and other optical devices have exchangeable objectives, the attachment 200 may be offered where active filtration is desired. Further, in one embodiment, the beamsplitter 22a is retractable, as well as the matrix 30 either manually or automatically, whenever the sensor 10 detects no bright light source 40 in the field of view.

The system 100 thus may be used to actively and dynamically neutralize the effect of bright light sources, such as the sun, a laser light, oncoming headlights, and others. Once the bright source is neutralized, the system 100 maintains high visibility in the rest of the field of view for the optical receptor. The system 100 may actively filter the bright light source without affecting the quality of the remainder of the image.

Figure 3B:
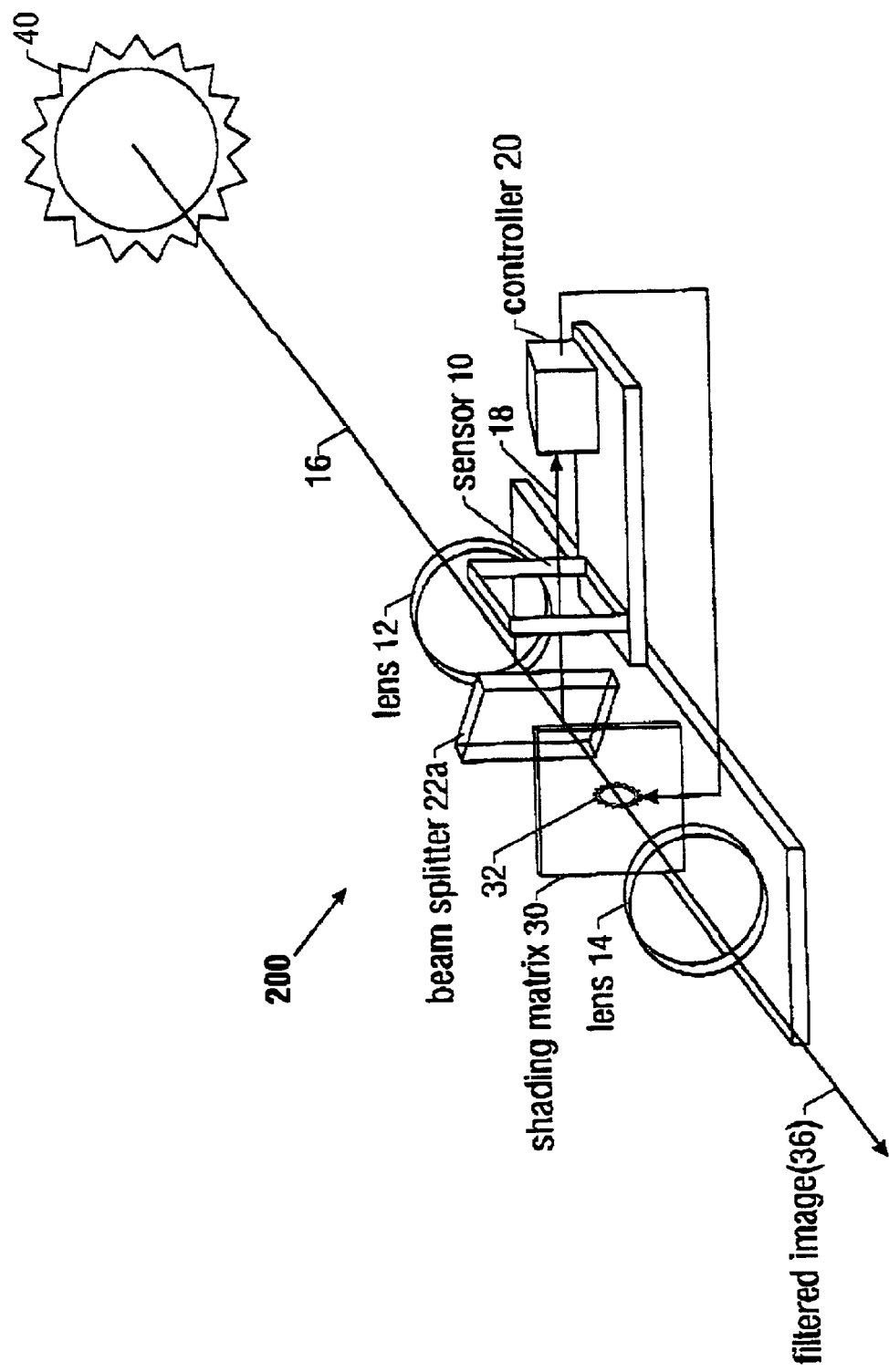
FIG. 3B is a perspective view of the optical device of FIG. 3A according to one embodiment of the invention.

In FIG. 3B, a perspective view of the attachment 200 built as a demonstrator illustrates how the bright light source 40 passes through the lens 12. A portion of the incident light 16 is deflected to the sensor 10, by the beamsplitter 22a. The controller 20 retrieves data from the sensor 10 and produces the dark spot 32 on the shading matrix 30. The remaining incident light 16 then passes through the lens 14 to be received by the receptor 50 (not shown). The receptor 50 thus receives the filtered image 36 where the bright light source 40 is totally or partially blocked by the dark spot 32.

The sensor 10 and the controller 20 may be moved away from the beamsplitter 22a, as desired. In some embodiments, the attachment 200 may support additional lenses, as needed, such that the sensor 10 may be positioned more remotely from the remaining components. The attachment 200 of FIGS. 3A and 3B may thus be used in optical devices such as video cameras or digital photo camera to dynamically filter bright light sources. Further, the attachment 200 may be used in binoculars, telescopes, night vision systems, heads-up displays and any other optical equipment which receives bright light.

Figure 4A:
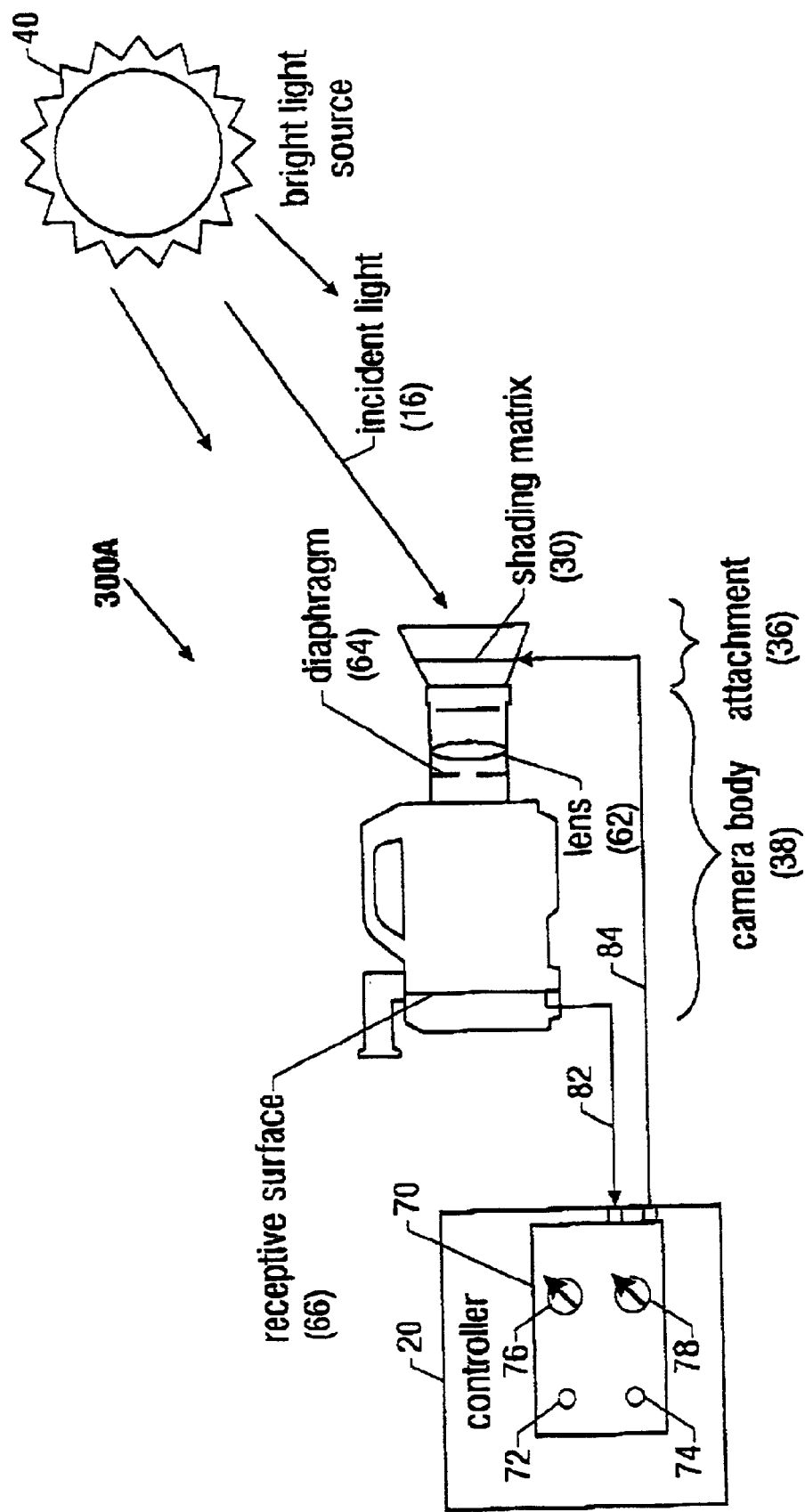
FIG. 4A is diagram of one embodiment of the system of FIG. 1 operating in a photographic or video camera.

In another embodiment, features of the system 100 may selectively be incorporated into an optical device while other features of the optical device itself are used to effectively block or filter bright light sources. For example, in FIG. 4A, a receptive surface 66 of optical device 300A acts as the sensor 10. The optical device 300A of FIG. 4A is depicted as a video camera, but may include other commonly available optical devices.

The optical device 300A includes an attachment 36, which may be added to a camera body 38. The shading matrix 30 is inside the attachment 36. Further, the controller 20 may be added externally to receive data from the receptive surface 66 and may update the shading matrix 30 as needed.

The camera body 38 itself includes features that are common to most optical devices. A lens 62 is adjacent to a diaphragm 64, which may open and close to allow or to restrict incoming incident light 16. The camera body 38 further comprises a receptive surface 66, such as photographic film or a photoreceptive matrix such as a CCD chip.

Film is typically composed of light-reacting molecules such as silver halide crystals. When light reaches the receptive surface, some of the silver ions in the silver halide crystals are converted to metallic silver atoms. This reaction essentially records the image transmitted to the receptive surface 66 by the incoming light. In digital cameras, a photoreceptive matrix such as an integrated circuit known as a charge-coupled device (CCD) replaces the film to record the incoming light. What was previously available on a film is thus available in a digitized form.

Because many receptive surfaces 66 provide image data in digital form, video cameras and digital photo cameras often include the capability to adjust the received image prior to processing. For example, in FIG. 4A, the optical device 300A includes parameter adjustment controls 70. In one embodiment, a threshold adjust 72, a darkness of spot adjust 74, a fade adjust 76, and an automatic/manual select 78 are part of the controller 20.

Alternatively, the parameter adjustment controls 70 may be part of the camera body 38 itself. The parameter adjustment controls 70 receive the digital information from the receptive surface 66 through a connection 82. Likewise, the parameter adjustment controls 70 are coupled to the shading matrix 30 by a connection 84. The connections 82 and 84 may be standard serial connections.

In one embodiment, one or more parameter adjustment controls 70 may be used to adjust the shading matrix 30. Further, the controller 20 may automatically adjust the shading matrix 30 based upon the information provided by the receptive surface 66.

For example, the controller 20 may receive digital information from the receptive surface 66. The digital information provided represents the entire image being viewed by the optical device 300A. In one embodiment, light intensity beyond a predetermined threshold value causes the controller to respond by modifying one or more cells of the shading matrix 30. The resulting opaque cells, ostensibly positioned in between the bright light source 40 and the receptive surface 66, effectively block the bright source 40 from being further "recorded" by the receptive surface.

In FIG. 4A, the shading matrix 30 is added as an attachment 36 to the front of the camera body 38. In a second embodiment, the shading matrix 30 may be placed inside the camera body 38, such as in the optical device 300B of FIG. 4B.

The optical device 300B may be preferred because the size of the matrix 30 as well as the exposure of the matrix 30 to the bright light source 40 is more limited than in FIG. 4A. However, in the embodiment of FIG. 4B, the shading matrix 30 may not be simply added to existing cameras but is, instead part of the camera body itself. The shading matrix can be built in together with the receptive surface as a one piece component. This would allow the matrix to be in focus, such as, in FIG. 3A (optical device 200), and have optimal optical characteristics. New LCD can be as thin as a film. If not selected by the user, the matrix can be retracted inside the camera, either automatically or manually.

Figure 4B:
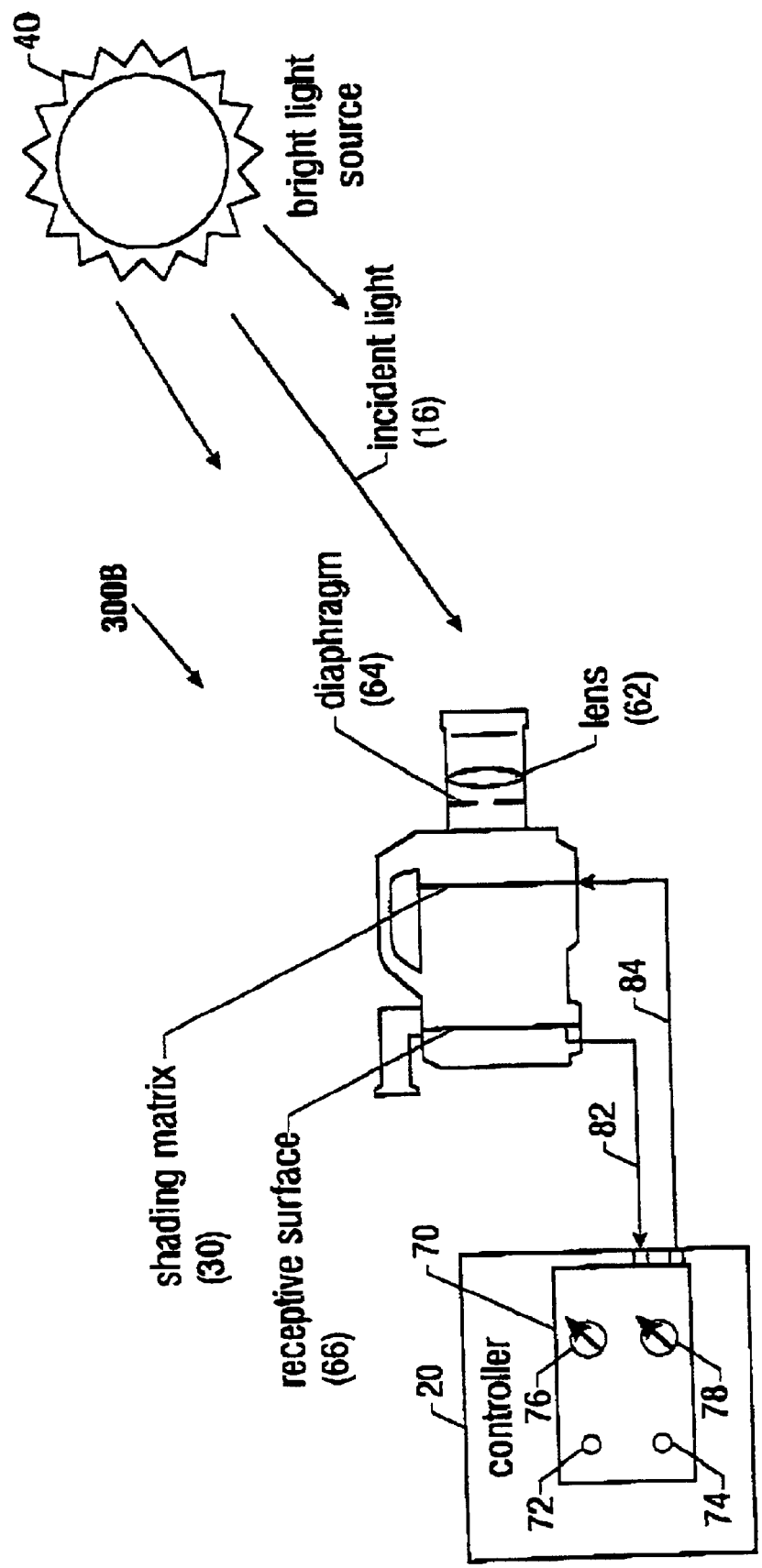
FIG. 4B is a diagram of a second embodiment of the system of FIG. 1 operating in a photographic or video camera.

In FIG. 4B, the optical device 300B may be pointed towards extremely bright sources, such as the sun, and still be able to image the remainder of the field of view. Due to the limited dynamic range of most video cameras, such an implementation may be particularly beneficial in critical operations where lighting conditions change drastically. Examples include space shuttle and space station operations guided by camera views.

Thus, in FIGS. 4A and 4B, the receptive surface 66 of either optical devices 300A or 300B is used as a sensor to produce an effective shading matrix 30. The receptive surface 66 receives incident light from a scene and converts the intensity information (above a certain threshold level, for example) into a quantity such as a voltage, for example. The receptive surface 66 sends the information to the controller 20, which updates the shading matrix 30 according to the location of the bright light source 40.

In contrast to embodiment of FIGS. 3A and 3B, in FIGS. 4A and 4B the receptive surface 66 (e.g., the sensor) is "behind" the shading matrix 30, relative to the bright light source 40. In FIGS. 3A and 3B, the sensor 10 essentially receives the deflected light 18 before or at the same time that the shading matrix 30 receives the incident light 16.

This difference in sensor placement behind the shading matrix 30 may result in a phenomenon known as a Larsen effect, also known as feedback. The Larsen effect is well-known among audiophiles and is produced when a source, such as a microphone, is proximate to a receiver, such as a speaker.

Where the receptive surface 66 is "behind" the shading matrix 30 relative to the bright light source 40, the receptive surface 66, as intended, may indicate that one or more cells of the shading matrix 30 need to be shaded. Accordingly, the controller 20 adjusts the individual voltages of the cells of the shading matrix 30 to produce the dark spot 32. The dark spot 32 effectively blocks the bright light source 40, from the perspective of the receptive surface 66.

However, at a next instant in time, the receptive surface 66 receives no indication of the bright light source 40 (because the bright light source has been blocked by the dark spot 32). Accordingly, at this next instant in time, the controller 20 may update the shading matrix 30, such that the bright light source 40 is no longer blocked. This, however, is not intended. At each subsequent time interval, the placement of and then the removal of the dark spot 32 from the shading matrix 30 may produce a "blinking" of the shading matrix 30, an effect analogous to the Larsen effect common with audio equipment.

Thus, according to one embodiment, the controller 20 employs "intelligence" to avoid this electronic Larsen effect by, in effect, "remembering" the quantity of filtration previously directed to the shading matrix 30 so that the controller 20 does not subsequently give a reverse order, that is, to remove the dark spot 32 from the shading matrix 30. In one embodiment, the controller 20 "tests" removal of the dark spot 32 from the shading matrix 30 periodically, before removing the dark spot 32 entirely.

Such intelligence may be implemented in a number of ways. For example, the controller 20 may include a memory that keeps a record of the shading matrix 30 at a previous point in time. The controller 20 may then review the memory contents prior to any dark spot removal. This is but one of several possible implementations which may avoid the "blinking" of the dark spot 32 on the shading matrix 30.

Figure 4C:
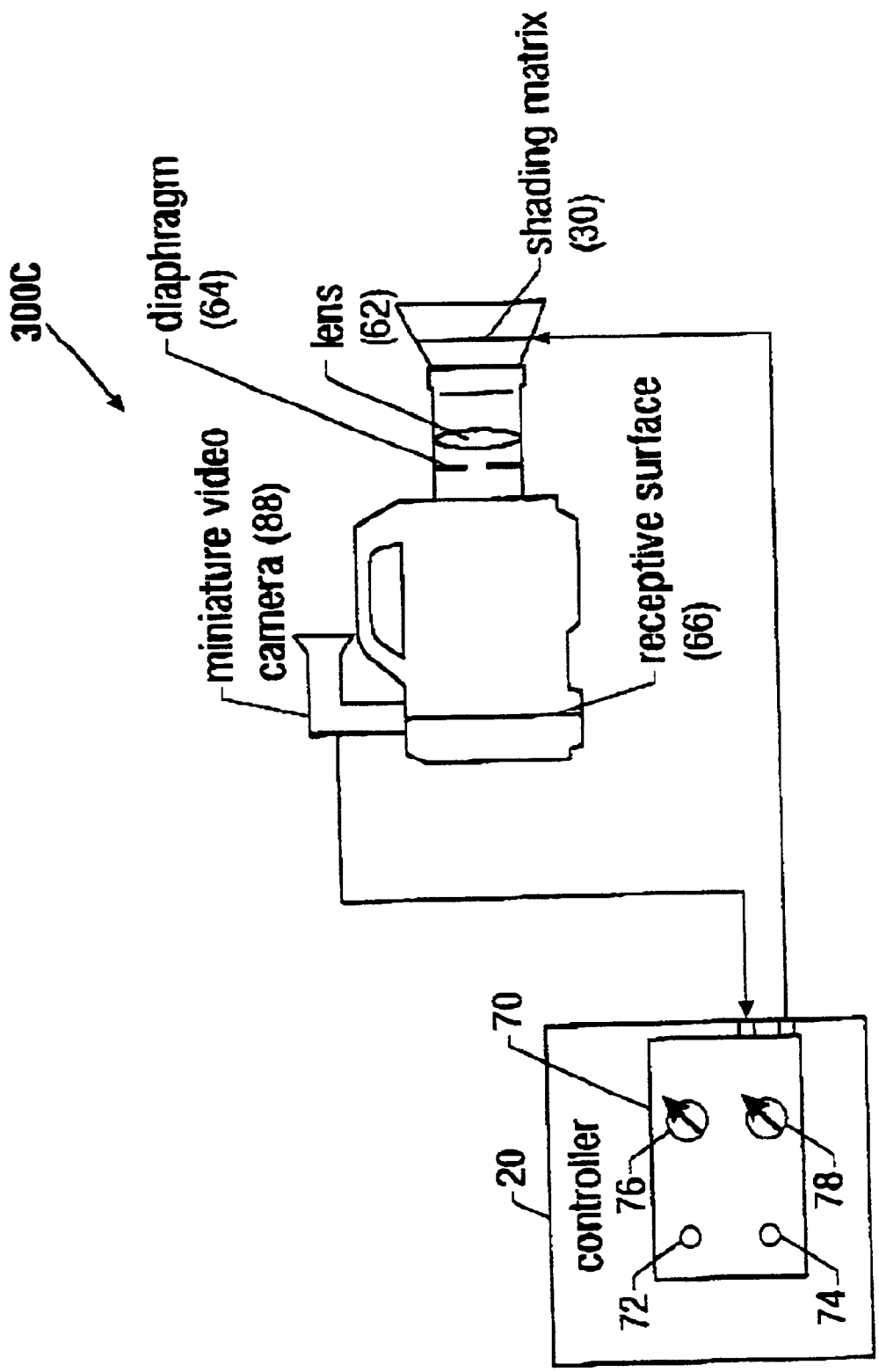
FIG. 4C is a diagram of a third embodiment of the system of FIG. 1 operating in a photographic or video camera.

In another embodiment, as illustrated in FIG. 4C, a miniature video camera 88 may act as the sensor 10, rather than using the receptive surface 66 to sense light intensity from the incoming incident light 16. The miniature video camera 88 thus drives the shading matrix 30 which can be in front of the objective or inside the camera, as described above (FIGS. 4A and 4B). The miniature video camera 88 may be a digital (CCD) camera or other device. Inexpensive miniature video cameras are plentiful, some of which are as small as a quarter inch in height. In one embodiment, the miniature video camera 88 is connected to the camera by a flash socket.

As in FIG. 4A, the shading matrix 30 may be attached to the front of the camera 300C, just as a standard filter might be connected. Because the miniature video camera 88 is not identical to the receptive surface 66, some adjustment to the shading matrix 30 may be necessary to account for this difference.

The systems described thus for provide dynamic filtration of bright light sources. As described above, these systems sense the incident light 16 from the bright light source 40 and dynamically produce a filter to block the light. A highly precise shading matrix 30 may be created to respond to bright light 40.

Where the human eye is the receptor 50, precision may be added to the system 100 by monitoring the human eye itself. As the eye moves, the appropriate location for the dark spot 32 will also move, as shown in FIG. 2.

Depending upon the application, several well-known techniques may be employed for monitoring the position of the eyes. For example, a pair of small sensors may be fitted to the frame of a pair of glasses. The sensors may be in contact with the skin of the receptor 50. The sensors may, for example, be of a type used in "nystagmus" sensing, a well-known technique used in medical research. (Nystagmus describes eye conditions associated with involuntary, oscillating eye movements.)

In one embodiment, the sensors transmit electronic analog signals proportional to the vertical and horizontal position of the eye. In this manner, a very precise determination of eye position may be made. This information may be sent to the controller 20, along with the light intensity information supplied by the sensor 10, to adjust the positioning of the dark spot 32 on the shading matrix 30.

In some applications, the attachment of sensors to the skin may be inconvenient. Instead, an eye gaze detection mechanism may be employed, such as may facilitate use of computer technology by the disabled. Already well-known in the art, such devices monitor movement of the eye. Where the eye position has not moved for a predetermined period of time from a position on a video screen, for example, such "eye gazing" is deemed equivalent to a mouse click. The eye gaze detection mechanism is often coupled with software. For providing dynamic filtration of bright light sources, the software may be part of the controller 20.

Finally, a miniature video camera, much like the miniature video camera 88 of FIG. 4C, may be directed to the eyes of the receptor 50 and thus monitor the position of the eye. Because miniature video cameras are now available in very small size, such camera could be fitted onto the frame of glasses, in an automobile or cockpit facing the receptor 50, or located in another non-invasive position.

The eye-sensing camera may first take a reference image of the eyes of the receptor when looking straight ahead with the bright source 40 in view, for example. The reference image may particularly identify the characteristic position of the image of the bright source 40 on the pupil of the eyes.

Figure 5:
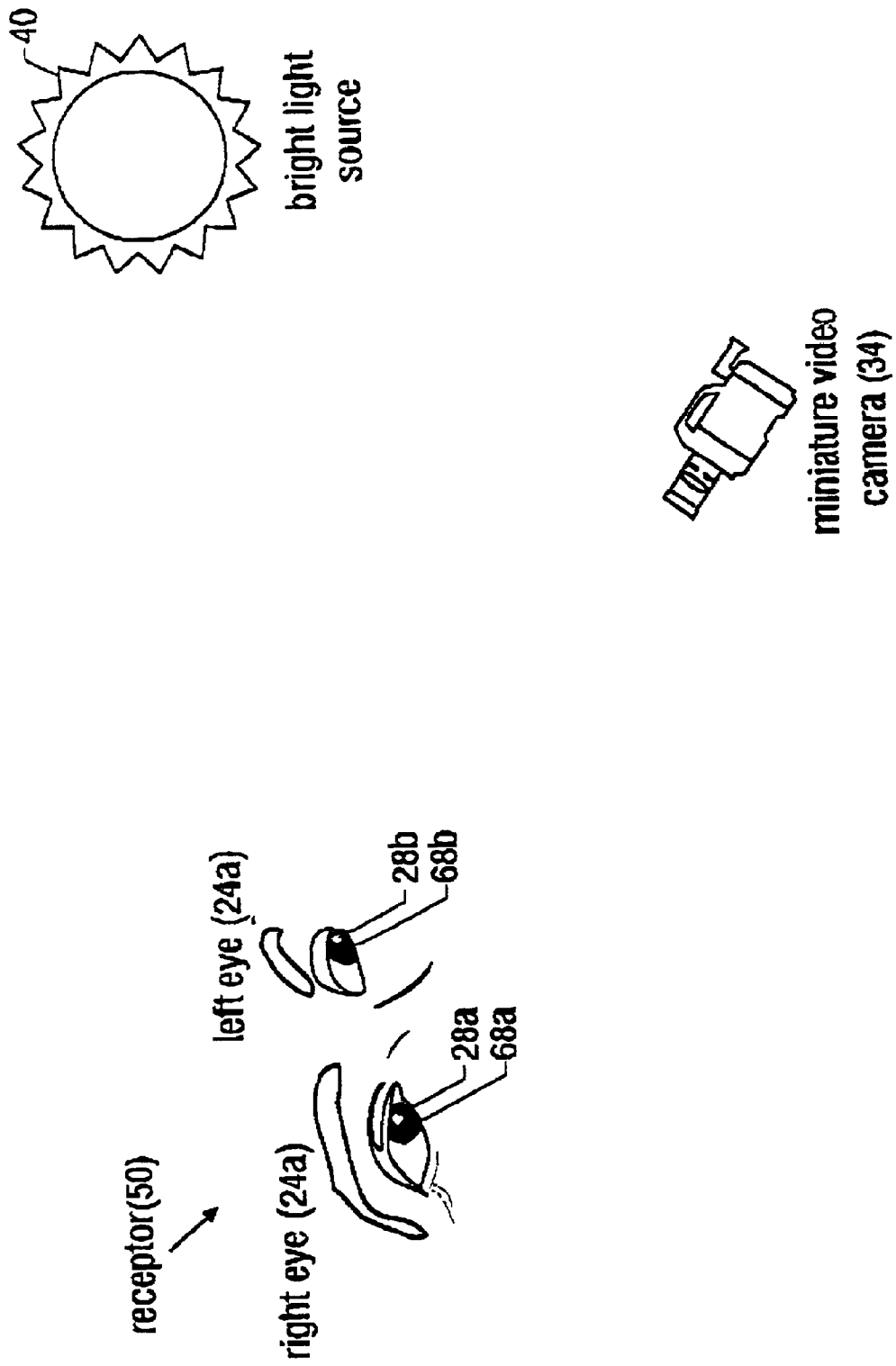
FIG. 5 is a diagram illustrating how a bright light source may be reflected on the eyes of a receptor according to one embodiment of the invention.

For example, in FIG. 5, the receptor 50 includes a pair of eyes 24, a left eye 24a and a right eye 24b. Because eyes are themselves reflective, the bright light source 40 may be "seen" in each eye as a spot 28a for the left eye 24a and a spot 28b for the right eye 24b. A miniature video camera 34 is positioned such that the spots 28a and 28b may be recorded as a reference image of the eyes 24a and 24b. The video camera 34 may be connected to the controller 20 (not shown) for downloading eye position information.

The reference image may be used any time the eye position moves by the controller 20 in order to detect eye movement. The dark spot 32 on the shading matrix 30 may accordingly be updated in response to this eye movement.

In one embodiment, the system 100 is used in helmets, such as for combat pilots. For example, the shading matrix 30 may be integrated into the helmet visor. A CCD camera may be employed to act as the sensor 10. Upon placement on the helmet, the field of view of the CCD camera may be adjusted to be equivalent to that of the pilot looking out of the visor.

In some embodiments, the helmet further includes a simple control panel, such as the control mechanism 70 of FIGS. 4A–4C. The control mechanism, for example, allows the pilot to adjust the background shading, threshold of sensitivity, size of the dark spot 32, and the location of both eyes. The helmet may thus dynamically filter bright light sources during use.

The dynamic filtration helmet may aid locating aircraft near the sun, which may particularly be helpful during air-to-air combat. The helmet may further assist a pilot during take-off and landing of the aircraft when the sun is low on the horizon, providing greater safety. Such a helmet may substantially improve view of the aircraft instruments, the runway environment, and other aircraft as compared to conventional visors. The system 100 may also be implemented in commercial aviation. For example, in FIG. 6, a cockpit 96 includes windshields 30a and 30b, both of which may include shading matrices 30. One or both of the pilots may thus effectively view a scene including a bright light source using the principles described herein.

Figure 6:
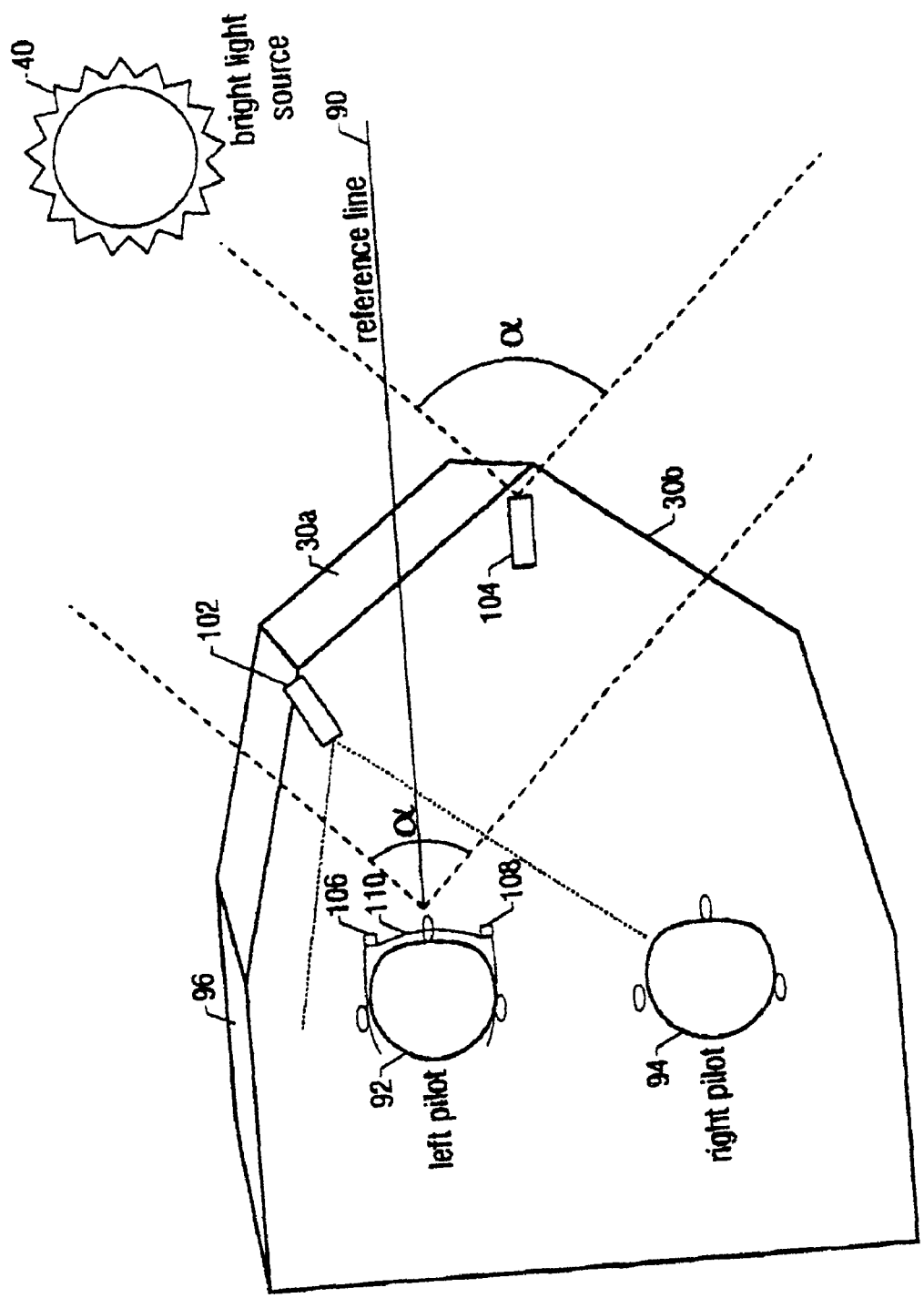
FIG. 6 is a diagram of one embodiment of the system of FIG. 1 as part of a cockpit of an aircraft.

In FIG. 6, an aviation cockpit 96 includes a left pilot 92 and a right pilot 94. A reference line 90 extends from the left pilot 92 in a direction parallel to a longitudinal axis of the cockpit 96. The position of the pilot 92, the pilot 94, or both pilots, may be measured relative to the reference line 90.

In one embodiment, the pilot 92 wears a pair of glasses 110, including a small ultraviolet reflector on each side. In FIG. 6, the glasses 110 include a left reflector 106 and a right reflector 108. These reflectors 106 and 108 may be illuminated by a small ultraviolet source (not shown).

In one embodiment, a miniature video CCD camera 102, operating in the ultraviolet light band, "sees" the reflectors 106 and 108. The CCD camera 102 monitors the reflectors 106 and 108 for movement relative to the reference line 90. Alternatively, a reference image of the position of the reflectors 106 and 108 may be initially taken by the CCD camera 102 and stored in a memory. The reference image may then be compared to a subsequent image. In either case, the controller 20 (not shown) may determine a change in position of the reflectors 106 and 108 by the CCD camera 102.

Using the change in position information, the controller 20 may then move the dark spot 32 of the shading matrix 30 to account for the movement of the pilot 92. The dynamic modification of the shading matrix 30 based on movement of the pilot 92 more effectively shades the bright spot from the view of the left pilot 92.

In FIG. 6, according to one embodiment, a second CCD camera 104 is positioned, this time facing the direction of view of the left pilot 92. As shown by the angle, a, the CCD camera 104 has the same field of view as the pilot 92. The CCD camera 104 thus operates as the sensor of the system 100 while the ultraviolet CCD camera 102 operates to detect movement of the receptor (e.g., the left pilot 92). Both cameras 102 and 104 may thus enable the controller 20 to properly position the dark spot 32 on the shading matrix 30.

Optionally, a miniature video camera (not shown) may be fitted to the glasses 110 of the pilot 92. The miniature video camera may be turned toward the pupils of the pilot's eyes. As described above, information received from this optional miniature video camera may additionally be supplied to the controller 20 in evaluating the most effective placement of the dark spot 32 on the shading matrix 30.

In one embodiment, the controller 20 provides effective shading of bright light sources for both the pilot 92 and the pilot 94, using shading matrices 30a and 30b. In another embodiment, the cockpit 96 includes two controllers to provide dynamic filtration for each pilot 92 and 94 separately. Additional CCD cameras may be positioned to monitor movement of the pilot 94, as desired. Alternatively, a heads-up display may include the active shading matrix 30 mounted upon it. A heads-up display supplies information, such as gauge data, typically on the windshield of a vehicle. Other implementations are possible as well for providing dynamic filtration of bright sources 40 in the cockpit 96.

Figure 7:
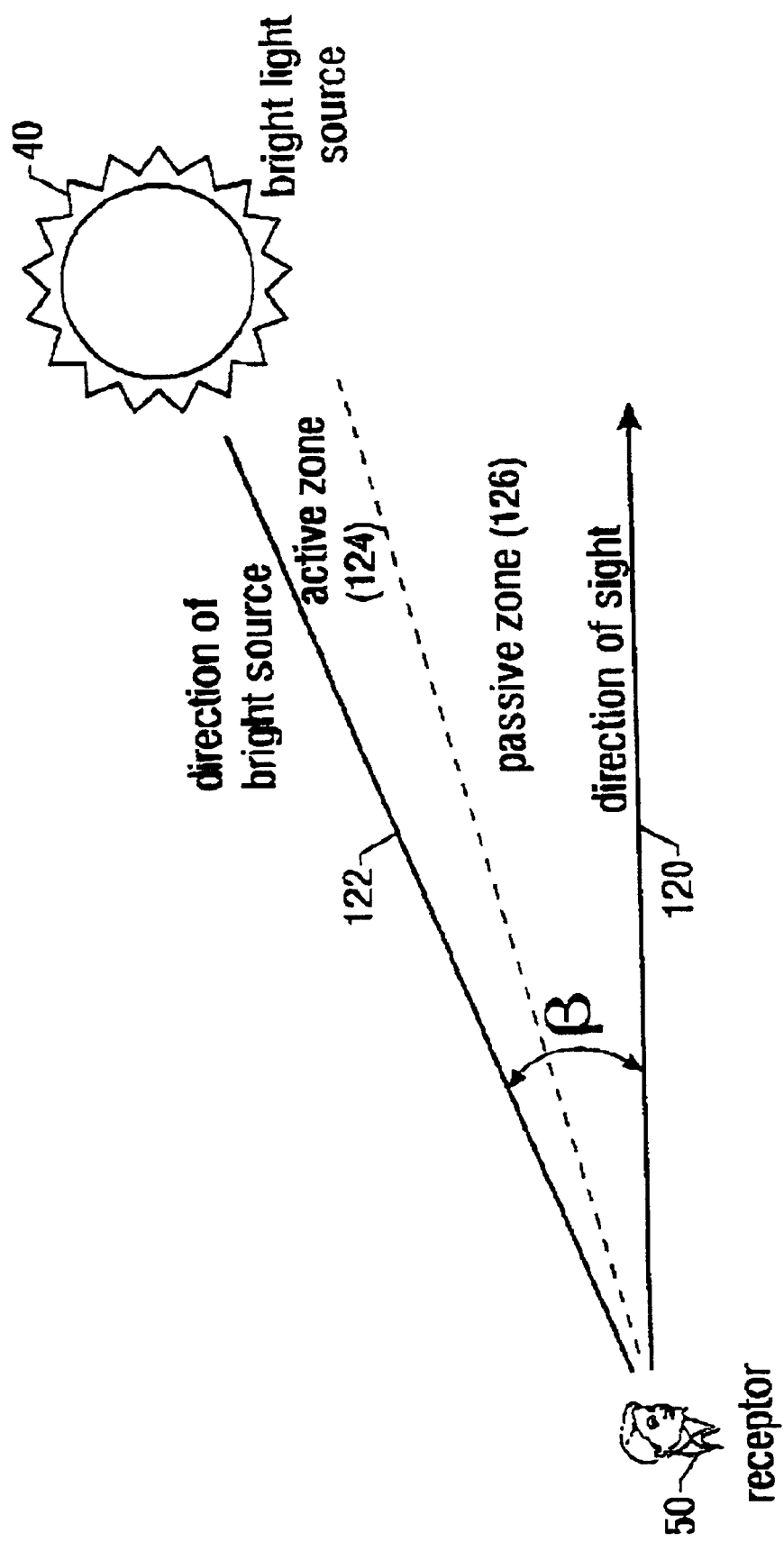
FIG. 7 is a diagram illustrating active and passive zones of a scene between the direction of sight of the receptor and the direction of the bright source according to one embodiment of the invention.

In some embodiments, the manner in which the controller 20 activates the shading matrix 30 may depend upon the direction of the bright source 40 relative to the direction of sight of the receptors 50. In FIG. 7, the receptors 50 are gazing in a direction of sight 120, or line of sight. Assume that the bright source 40 sends incident light rays 122 to the receptors 50. An angle, β, lies between the direction of sight 120 and the direction of the bright source 122. Inside the angle, β, two zones are defined: an active zone 124 and a passive zone 126. (The passive zone 126, in actuality, may extend beyond the direction of sight 120.)

As may be observed on any sunny day, when the direction of sight 120 is not close to the direction of the bright source 122, such as in the passive zone 126, virtually any shading mechanism may be effective to block the bright source 40 without adversely impacting a clear view of the remaining image. On the other hand, when the angle, β, is small, such as in the active zone 124, the shape, darkness, and other characteristics of any shading medium become very important for proper viewing of the image.

The differences between the active zone 124 and the passive zone 126 may be observed when driving or flying with the sun close to the line of sight. Any dark shade used to preserve the image during bright light conditions may be acceptable when the image is in the passive zone 126. While in the active zone 124, however, a dark shade may not only cut off the image being viewed but the receptors 50 may also focus on the dark object, such as a sunshade, when the line of sight 120 is close to the direction of the bright source 122.

Thus, according to one embodiment, the system 100 of FIG. 2 may generate distinct dark spots 32 in the shading matrix 30, depending upon whether the direction of sight 120 is in the active zone 124 or in the passive zone 126. Where the direction of sight 120 is close to the direction of the bright source 122 (A is small), the dark spot 32 may encompass only the bright source itself, for example, from the perspective of the receptor 50. Where the direction of sight 120 is far from the direction of the bright source 122 (p is large), the dark spot 32 may be larger than when β is small.

Figure 8:
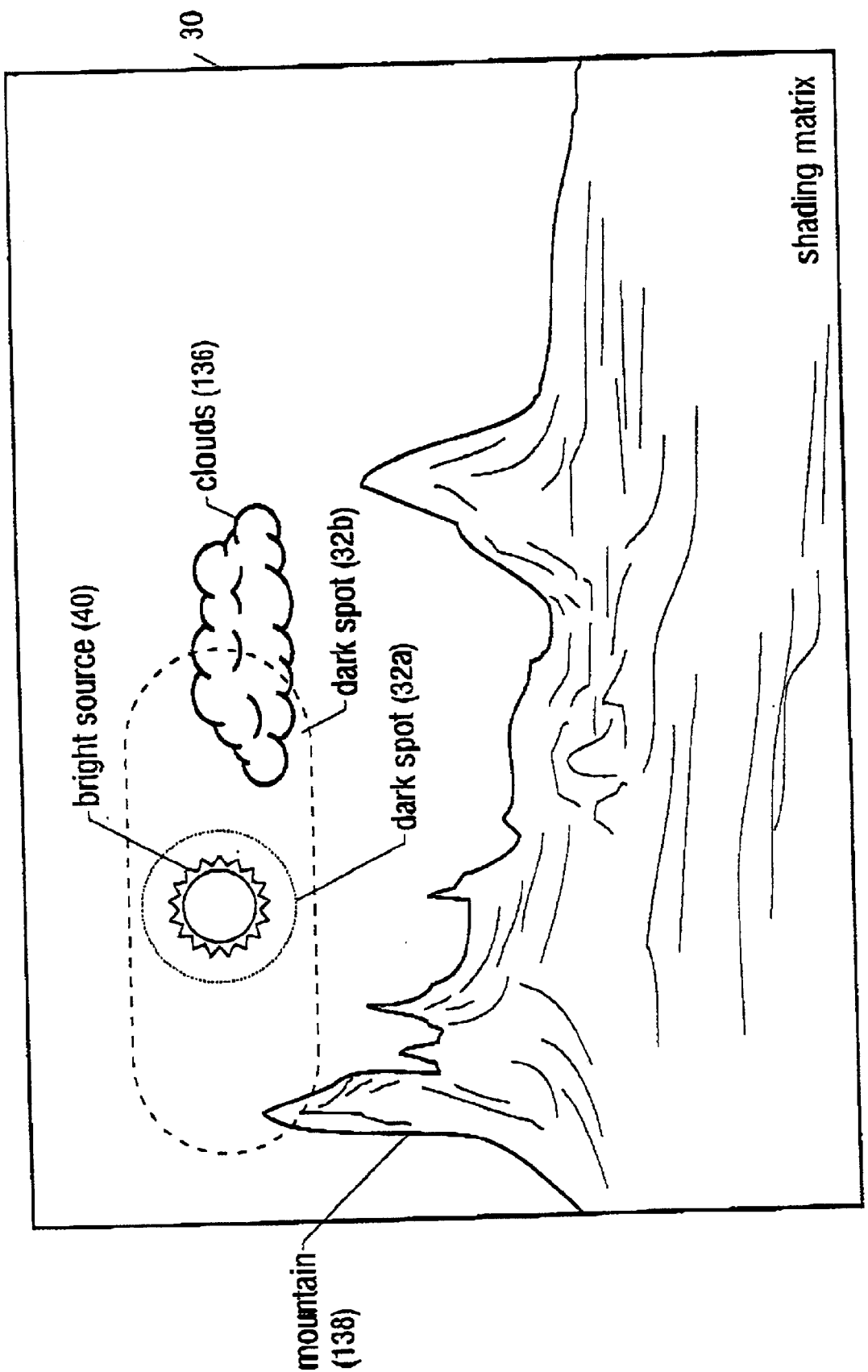
FIG. 8 is a diagram illustrating possible implementations for blocking a bright light source based upon whether the direction of sight is in the active or the passive zone according to one embodiment of the invention.

In FIG. 8, for example, the bright source 40 is viewed through the shading matrix 30 from the perspective of the receptor 50. In one embodiment, the dark spot 32a is generated when the direction of sight 120 is in the active zone 124, e.g., β is small. For the most part, the bright source 40 is shaded without shading any surrounding imagery, such as the clouds 136 or the mountain 138.

On the other hand, when the direction of sight 120 is in the passive zone 126, e.g., β is large, the controller 20 produces a different dark spot 32b. In the passive zone 126, the dark spot 32b actively shades the bright source 40, as desired. Additionally, however, portions of the clouds 136 and the mountain 138 are shaded by the dark spot 32b. Because the direction of sight 120 is in the passive zone 126, the larger dark spot 32b does not impair imaging of the remaining scenery by the receptors 50.

For human eye receptors 50, the miniature video camera 34 of FIG. 5 may be used to determine whether the direction of sight 120 is in the active zone 124 or in the passive zone 126. Recall that the miniature video camera 34 may detect a spot 28a on the right eye 24a and a spot 28b on the left eye 24b of the receptor 50. The spots 28 are essentially reflections of the bright light source 40 on the eyes 24.

According to one embodiment, whenever the spots 28 are directly on or very close to the pupils 68 of the eyes 24, the direction of sight 120 is in the active zone 124. Whenever the spots 28 are not very close to the pupils 68 of the eyes 24, the direction of sight is in the passive zone 126. What is deemed "very close" may be determined through experimentation. The information received by the miniature video camera 34 may be supplied to the controller (not shown) to generate an appropriate dark spot 32, as shown in FIG. 8.

According to some embodiments, other optical phenomena may be considered when configuring the dark spot 32 on the shading matrix 30. In the case where the receptor 50 is a pair of human eyes, for example, the dark spot 32 which is generated on the shading matrix 30 may be derived based upon a visual phenomenon known as the parallax effect.

Due to the parallax effect, the left eye and the right eye do not precisely see an image in exactly the same position. The parallax effect may be observed by closing one eye, then the other eye, when viewing an image. Likewise, the bright light source 40 is independently viewed by the two eyes of the receptor 50.

Figure 9A:
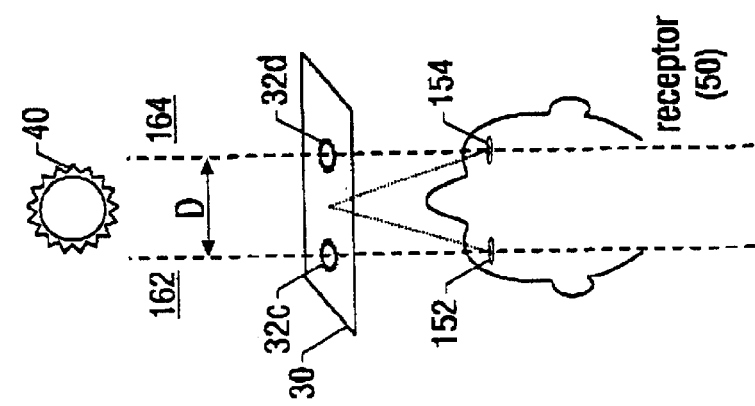
FIGS. 9A–9D illustrate the parallax phenomenon according to one embodiment of the invention.

In FIG. 9A, the receptor 50 is a human, including left eye 152 and right eye 154. The shading matrix 30 is positioned between the receptor 50 and the bright light source 40, as expected. According to the parallax effect, each eye receives an independent view of the bright light source 40. An imaginary line 162 connects the left eye 152 and the bright light source 40. A second imaginary line 164 connects the right eye 154 and the bright light source 40. The left eye 152 and the right eye 154 are a distance, D, apart. The lines 162 and 164 intersect the shading matrix 30 at different points.

Figure 9C:
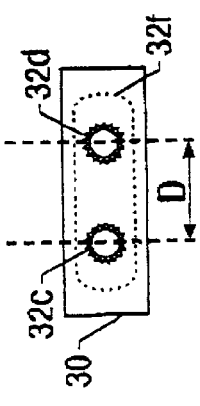

In FIG. 9A, the receptor 50 focuses on the shading matrix 30. During this time, the bright light source 40 may be effectively shaded by producing a dark spot 32c for the left eye 152 view and a dark spot 32d for the right eye 154 view. The dark spots 32c and 32d correspond to the intersection of imaginary lines 162 and 164, respectively, with the shading matrix 30. FIG. 9C is a view of the shading matrix 30 with the dark spots 32c and 32d, as seen by the receptor 50. As in FIG. 9A, the receptor 50 is focusing on the matrix 30.

Figure 9B:
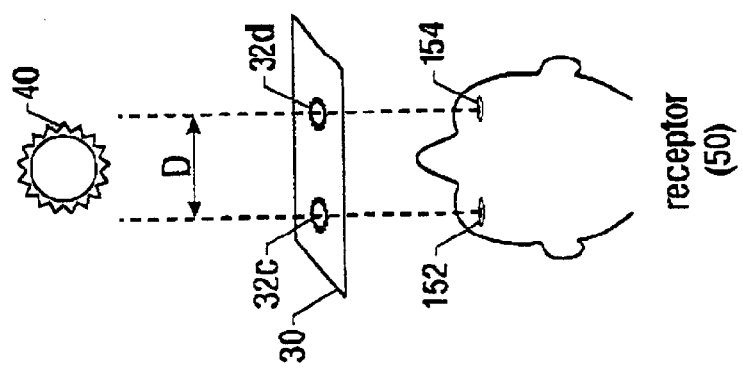

In FIG. 9B, the receptor 50 focuses beyond the shading matrix 30, such as toward the bright light source 40 itself. Likewise, in FIG. 9D, a view of the shading matrix 30 as seen by both eyes, illustrates the parallax effect. The image is seen in "double," both by the left eye 152 and the right eye 154, as well as two matrixes 30a and 30b. Depending on the position of the matrix 30 from the eyes 152 and 154, the line of sight of the eyes, and other factors, the two matrixes 30a and 30b may merge as a single matrix 30.

Further, according to the parallax effect, an apparent third dark spot 32e appears in front of the bright light source 40, as seen by the receptor 50. This apparent dark spot 32e is not actually present, but is virtual only. In fact, the dark spot 32d of the matrix 30 (seen by the right eye) and the dark spot 32c of the matrix 30 (seen by the left eye) merge into the virtual dark spot 32e, as illustrated in FIG. 9D.

Figure 9D:
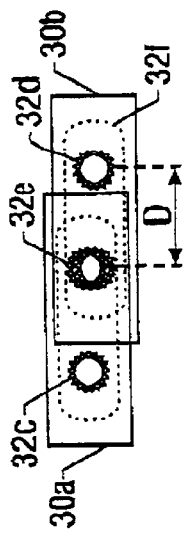

In some embodiments, the dark spots 32c and 32d may be "bridged" together, to form a dark spot 32f, as shown in FIGS. 9C and 9D. For some viewers, the single dark spot 32f in the field of view may be preferred as more comfortable than viewing the real dark spots 32c and 32d and the virtual dark spot 32e.

In one embodiment, the parallax effect is considered when building the dark spot 32 while in the active zone 124. Because, as described above, images in the active zone 124 may be more adversely impacted by over-shading of the bright light source 40, a precise construction of the dark spot 32 in the shading matrix 30 which considers the parallax effect, may provide more effective filtration.

The controller 20 (FIG. 1) may receive information from many sources in adjusting the shading matrix 30. Initially, the controller 20 determines the intensity of the incident light 16 from the sensor 10. In some embodiments, the controller 20 also adjusts the location of the dark spot 32 on the shading matrix 30 based upon any movement of the receptor 50. Further, in some embodiments, the controller 20 may monitor the direction of sight 120 as well as the number of optical receivers (e.g., a pair of eyes) in the receptor 50 in deciding the shape of the dark spot 32 to be produced.

Figure 10A:
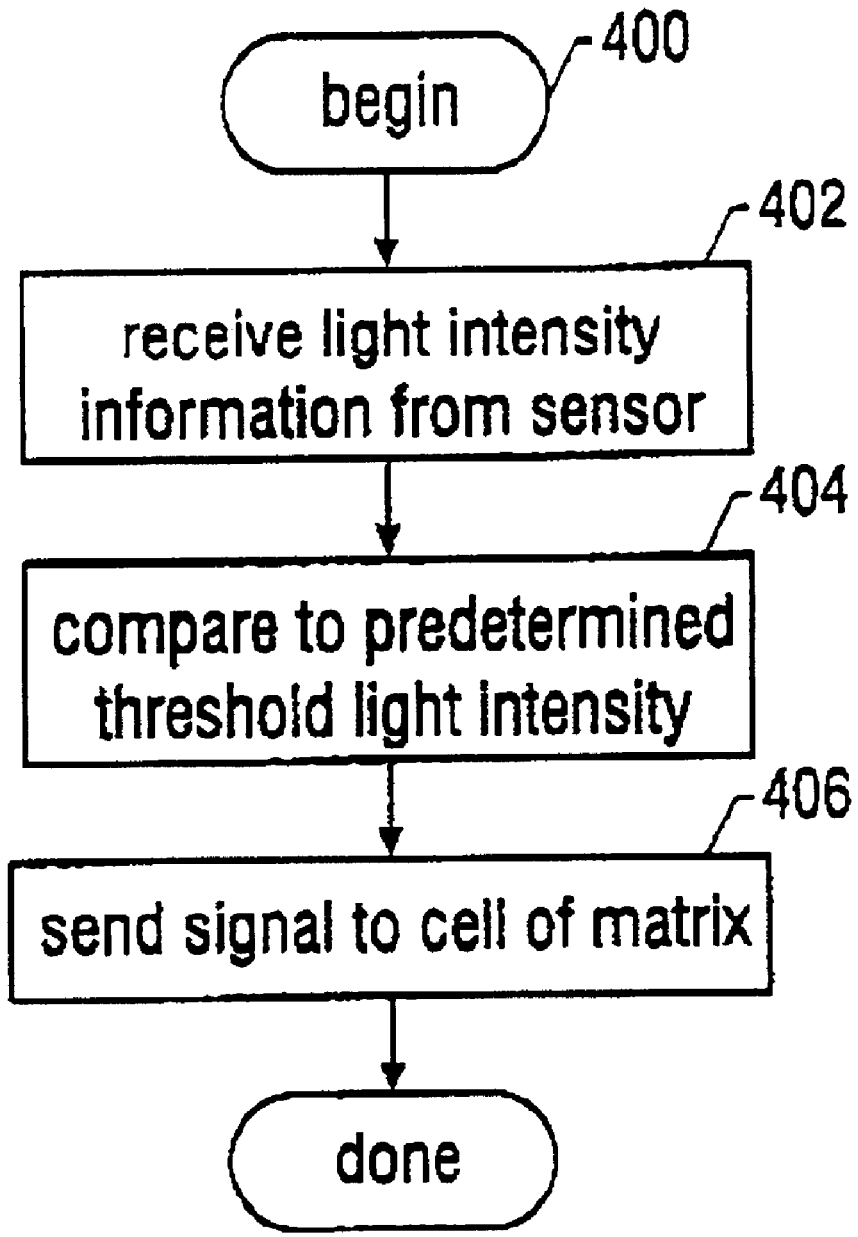
FIGS. 10A and 10B are flow diagrams illustrating the operation of a software program according to one embodiment of the invention.

In one embodiment, the controller 20 is a processor-based system including a software program 400 which analyzes the placement and size of the dark spot 32 on the shading matrix 30 according to the above considerations. In FIG. 10A, the software program 400 begins by redirecting a portion of incident light to a sensor (block 401). Next, the software program 400 may continue by receiving the light intensity information from the sensor 10 (block 402). Recall that the sensor 10 includes photo-sensitive cells which convert the incident light 16 into a signal such as voltage.

This voltage may be compared to a threshold value. Accordingly, in one embodiment, the software 400 compares the received voltage to a predetermined threshold voltage representing light intensity (block 404). Depending on the result, the software 400 may then send a signal to one or more cells of the shading matrix 30 (block 406), such that the opacity of the cells is changed. The operation of the software 400, according to one embodiment, is thus complete.

Determining where on the shading matrix 30 to send the signal is another function of the software 400. According to one embodiment, a subroutine 420 which may be called by the software 400, is described in the flow diagram of FIG. 10B. The location of the bright light source 40 is identified (block 422). The location of the receptor 50 is also identified (block 424). The software program 420 may construct an axis between the bright light source 40 and the receptor 50 (block 426), such as the axis 26 in FIG. 2.

Because the shading matrix 30 is between the bright light source 40 and the receptor 50, the axis intersects the shading matrix 30 at one or more cells. The software 420 may then determine which cells are in the area of intersection (block 428).

Although a single cell of the shading matrix 30 may be intersected, the software 420 further may determine the breadth of cell adjustment to be made (block 430). The breadth of the cell adjustment may be influenced by a number of factors, including the size of the bright light source 40 relative to the receptor 50, the whether the direction of sight is in the active or the passive zone, and the parallax effect. Once the software 420 determines which cells on the shading matrix 30 are to be adjusted, the adjustment is then made (block 432).

In the embodiments discussed so far, the shading matrix 30 has principally comprised liquid crystal display or other media, the individual cells of which may be turned more opaque upon receiving a signal from the controller 20. In accordance with one embodiment, the shading matrix 30 may instead comprise a digital micro-mirror device (DMD). The DMD technology is discussed briefly, below.

Figure 11:
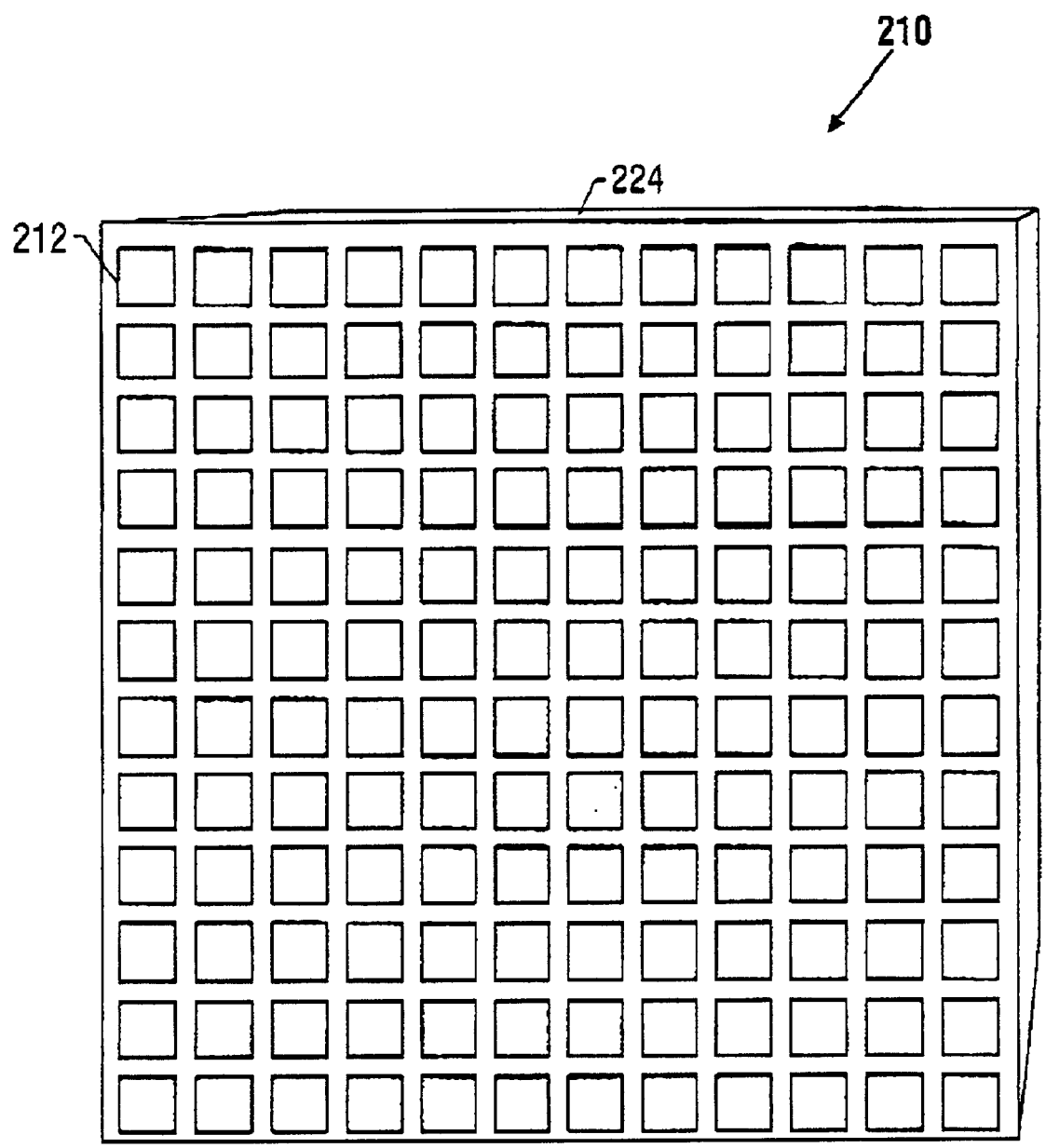
FIG. 11 is a block diagram of a digital micromirror device according to the prior art.

As shown in FIG. 11, a DMD 210 has a structure in which a static random access memory (SRAM) chip 224 is covered with tiny aluminum mirrors 212. For example, each individual aluminum mirror 212 may measure 16 micrometers square. Each mirror is supported by a hinge, which allows the mirror to rotate in either a plus or minus 10-degree angle from the resting position.

Initially, DMD chips have been used to project high-quality video images to relatively large projection screens. The tiny mirrors 212 of the DMD 210 each control the reflection of light from a source in projecting a picture on a screen. Each individual mirror 212 on the SRAM chip 224 selectively displays color information from a light source to be displayed on a large screen.

The individual DMD mirrors 212 are in a horizontal position when the chip 224 receives no power. Accordingly, the DMD 210 looks like a normal mirror. When power is sent to the DMD 210, the mirrors 212, which respond very quickly, move to either a plus 10-degree or a minus 10-degree inclination, depending upon the power sign (1 or 0) applied to each mirror 212.

According to one embodiment, the DMD 210 may filter bright light sources by reflecting all or part of the light away from a receptor. Each individual mirror 212 of the SRAM chip 224 may be used to selectively filter a portion of the light received.

The DMD 210 may be used as a selective mirror. For example, where no bright source is available to be filtered, the individual mirrors 212 comprising the DMD 210 may remain passive and totally reflective. The image of an observed landscape may thus be focused on the DMD 210. Where a source of light that exceeds a predetermined threshold level is detected, a mirror 212 associated with the source may be adjusted such that light is no longer reflected to the receptor 50.

Figure 12:
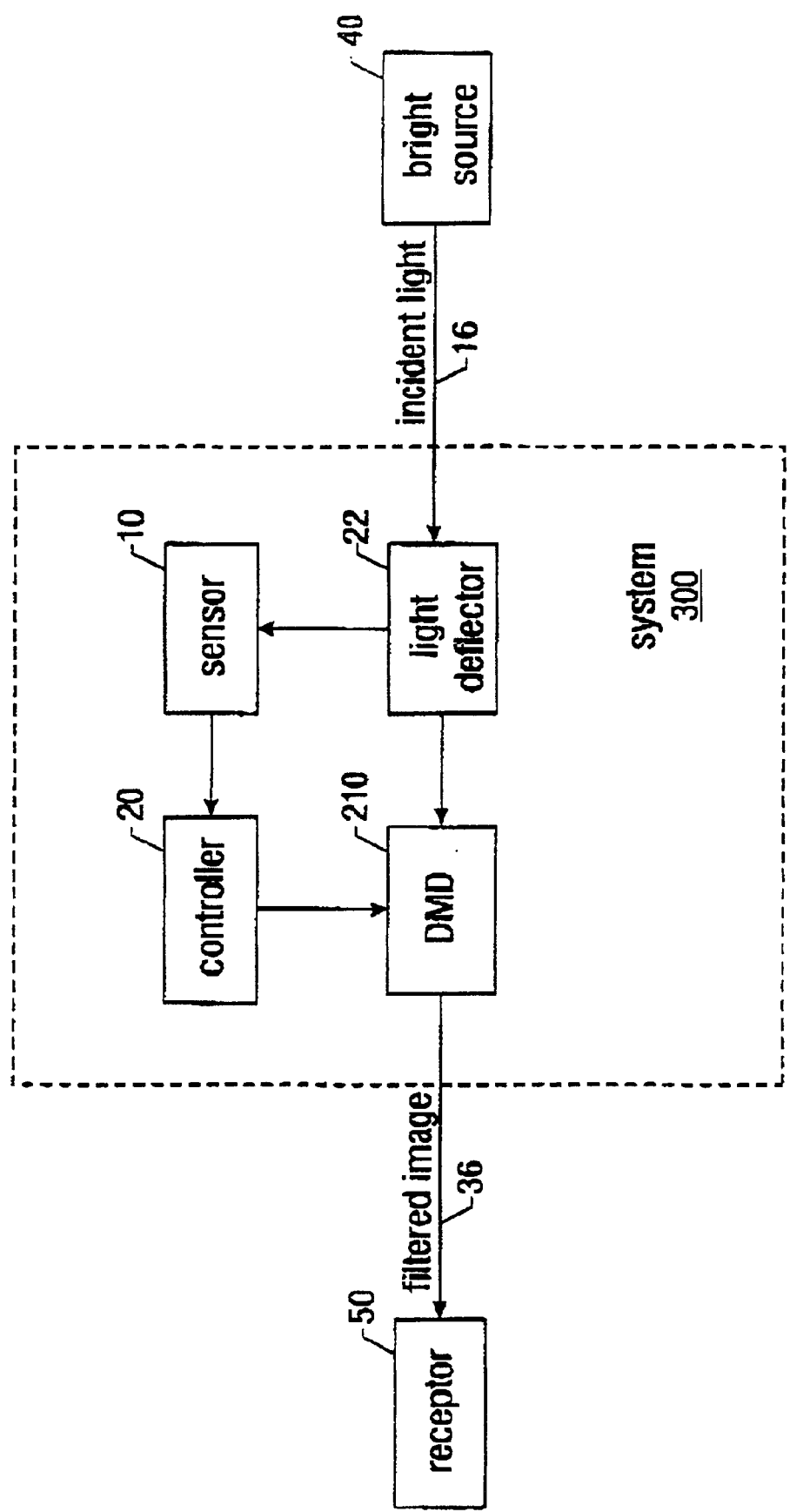
FIG. 12 is a block diagram of a system implementing dynamic filtration using a digital micromirror device according to one embodiment of the invention.

In FIG. 12, a system 300 receives incident light 16 from a bright light source 40 and may filter a portion of the light 16 before being received by a receptor 50. Like the system 100 of FIG. 1, the system 300 includes a sensor 10 which receives a portion of the incident light 16 from the light deflector 22. The sensor 10 converts the light to a form, such as a voltage, which may be analyzed by a controller 20. The remainder of the incident light 16 passes through the light reflector 22 to be received by the DMD 210.

For light intensity which exceeds a predetermined threshold value, according to one embodiment, the controller 20 may direct the DMD 210 to turn one or more mirrors 212 (not shown) such that the light does not reach the receptor 50. In this manner, the DMD 210 may filter some of the light.

Figure 13:
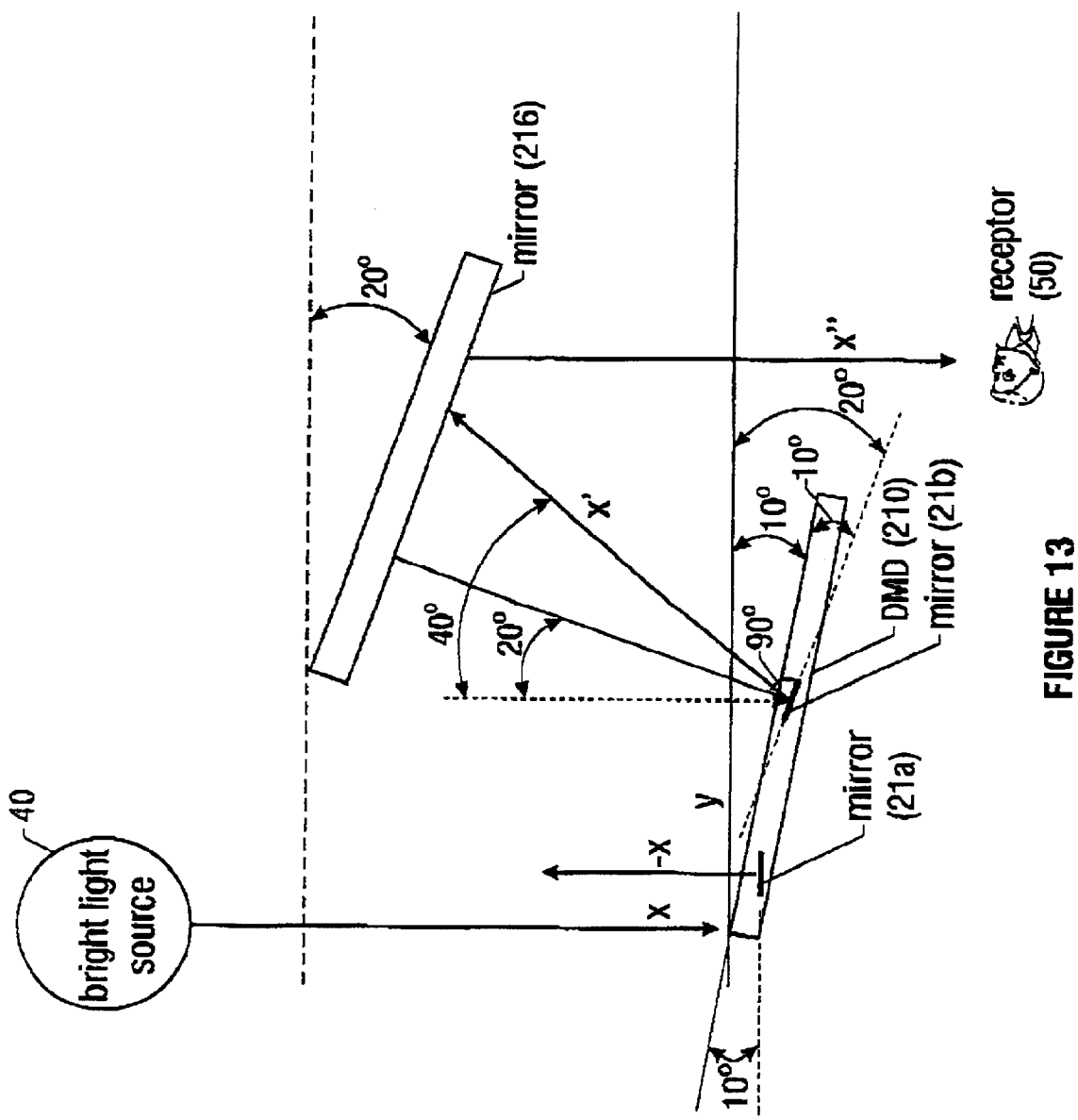
FIG. 13 is a block diagram illustrating how a digital micromirror device may selectively deflect a bright source from a receptor according to one embodiment of the invention.

FIG. 13 illustrates how the bright light source 40 is processed, according to one embodiment. The mirrors 212 of the DMD 210 are disposed at a minus 10-degree angle (212a) and a plus 10-degree angle (212b), relative to the axis of the DMD. A single mirror of each orientation is shown to simplify the illustration, although the DMD 210 may include thousands of mirrors 212. Likewise, the mirrors 212a and 212b may be oriented at other angles relative to the axis of the DMD.

Light is received from the bright light source 40, indicated as beam, x. An axis, y, is orthogonal to the axis, x. In one embodiment, the DMD 210 is positioned at an angle ten degrees from the y axis, in a clockwise direction, as shown in FIG. 13.

The mirrors 212a and 212b of the DMD 210 have two stable positions: plus 10 degrees and minus 10 degrees, relative to the axis of the DMD 210 itself. Where a light beam, x, hits the mirrors 212a, the beam is reflected beck along the x-axis, as if back toward the bright light source 40 (shown as -x). For a typical light source 40 centered on the axis, x, for example, the mirrors 212a reflect light right back to the source 40.

When the light beam, x, reaches the mirrors 212b, however, according to one embodiment, the beam x is reflected as x' toward a second mirror 216. In one embodiment, the mirror 216 is positioned at an angle twenty degrees in a clockwise direction from a plane parallel to the y-axis The image x' is reflected off the mirror 216 as beam x". The mirror 216 is positioned such that the beam, x", is parallel to the incoming beam, x. In some implementations, this characteristic may be desirable, but the mirror 216 may be placed in any of a number of positions. In any event, the beam, x" may be received by the receptor 50.

Where light is to be reflected out as x", the mirrors 212*b* of the DMD 210 are activated. Where light is to be filtered, the mirrors 212*a* of the DMD 210 are activated. For incoming light containing a variety of light intensities, light beyond a predetermined threshold intensity may be selectively diverted away from the receptor 50. In FIG. 13, higher intensity light is reflected back in the direction of the bright light source 40, but different positioning of the DMD mirrors 212*a* and 212*b* may be employed, as desired. The DMD 210, like the shading matrix 30 of FIG. 1, may thus be used to filter the bright light source 40.

Figure 10B:
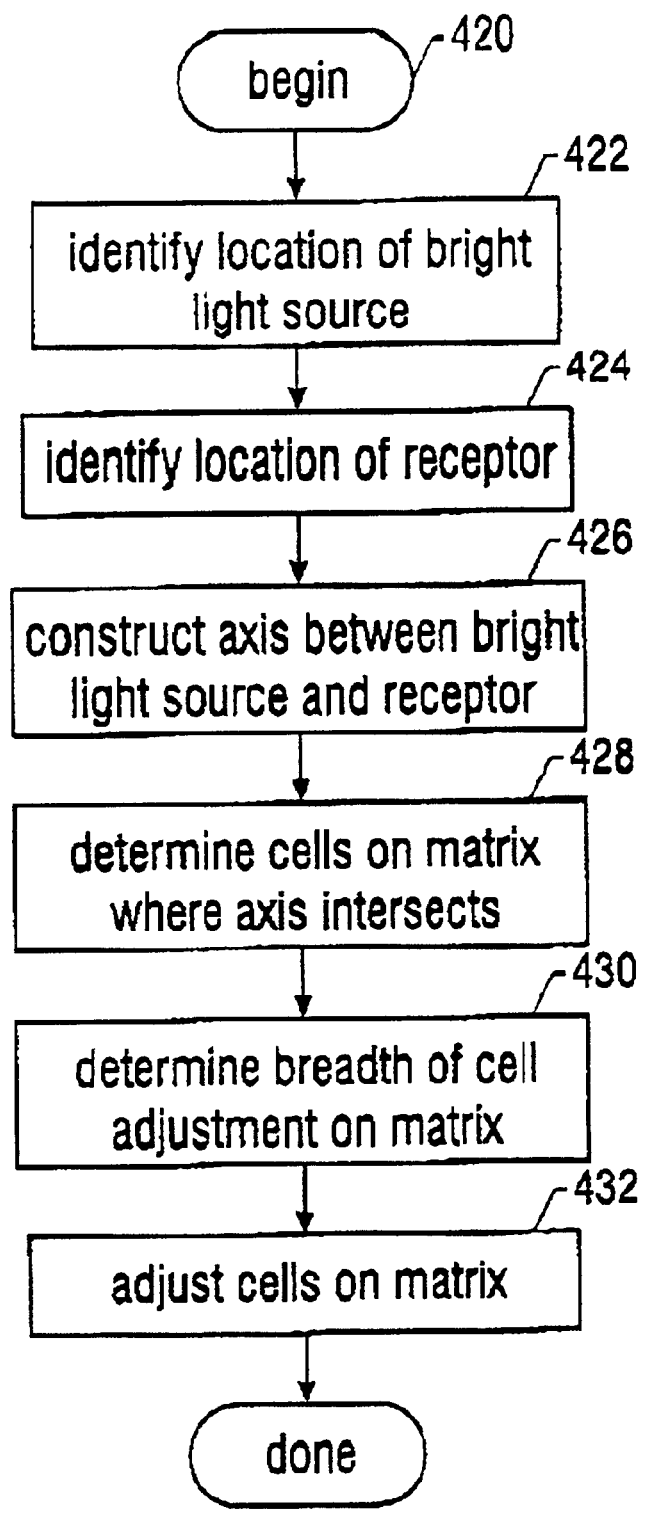

Like the controller 20 of FIG. 1, the controller 20 of FIG. 12 may include software such as the software 400 of FIGS. 10A and 10B. In some embodiments, the calculations used to determine which mirrors are reflected and which are not (analogous to determining where to position the dark spot 32 on the shading matrix 30) may differ from the flow diagram of FIG. 10B. This is because the DMD 210 is not positioned directly between the bright light source 40 and the receptor 50.

However, in FIG. 13, based on the position of the receptor 50 and the angle of the mirror 216, a software program in the controller 20 may determine which of the mirrors 212 to reflect, based upon the location of the bright light source 40 and the receptor 50.

Figure 14:
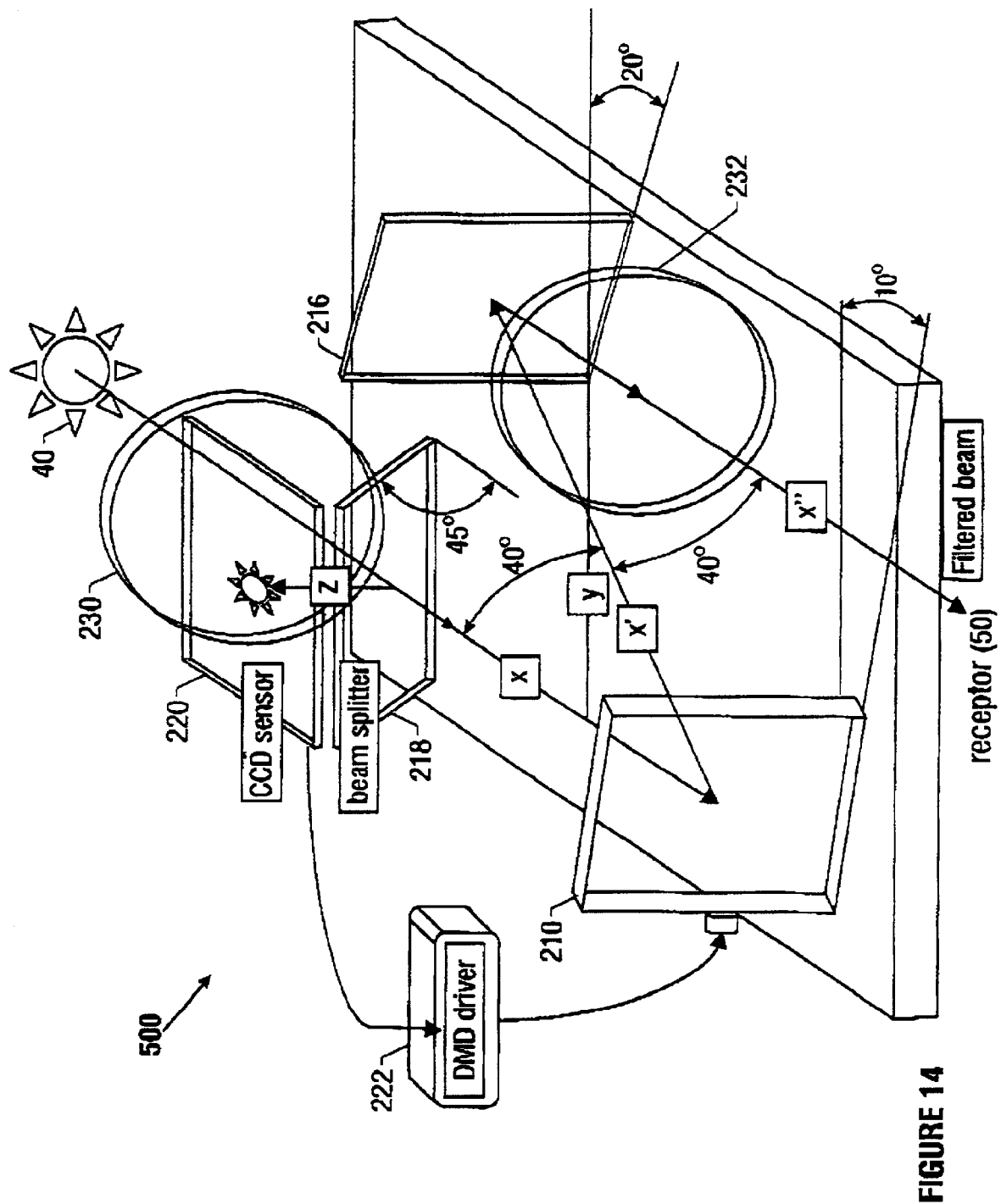
FIG. 14 is a perspective view of the system of FIG. 12 according to one embodiment of the invention.

In FIG. 14, according to one embodiment, the system 500 provides dynamic filtration of bright light sources using the DMD 210 of FIG. 13. Similar to the shading matrix-based systems of prior embodiments, the system 500 includes a beamsplitter 218, a CCD sensor 220, and a DMD driver 222. Further, the system 500 is positioned to receive incident light from the bright light source 40 and sends filtered light to the receptor 50.

The bright light source 40 produces incident light, as illustrated by the beam, x. The beamsplitter 218 deflects a portion of the incident light, x, to the CCD sensor 220, shown as beam, z. The CCD sensor 220, like the sensor 20 of FIG. 1, receives light intensity and location information from the image being viewed by the receptor 50.

Important note: the general optical arrangement is such as it was for the LCD application, as described in FIGS. 3A and 3B. The incoming beam focuses on both CCD sensor 220 and DMD 210. Lenses 230 and 232 play the same role as lenses 12 and 14 in FIGS. 3A and 3B.

The CCD sensor 220 is coupled to the DMD driver 222. Like the controller 30 of FIG. 1, the DMD driver 222 may be a processor-based system, such as a laptop computer including software, or other intelligent hardware and/or software, such that the information sent by the CCD sensor 220 may be analyzed.

The DMD driver 222 drives, or controls, individual mirrors 212*a* and 212*b* of the DMD 210. The mirrors 212*a*, e.g., those that are positioned minus 10 degrees relative to the DMD 210, reflect light back toward the source 40. The mirrors 212*b*, e.g., those that are positioned plus 10 degrees relative to the DMD 210, reflect incoming light toward the mirror 216, shown as beam x'. The mirror 216 is positioned such that light deflecting from the mirror 216, x", the filtered beam, travels in a direction parallel to the original incoming beam, x.

Whenever the DMD driver 222 determines that some photocells of the CCD sensor 220 are saturated, that is, receiving excessive light, the corresponding mirrors 212*a* on the DMD 210 are activated (minus 10 degrees). The bright light source 40 is then reflected back on its initial path. The other mirrors 212*b* (plus 10 degrees) reflects toward the mirror 216. The outgoing beam, x", is thus a filtered beam which shades only the bright light source 40.

Figure 15:
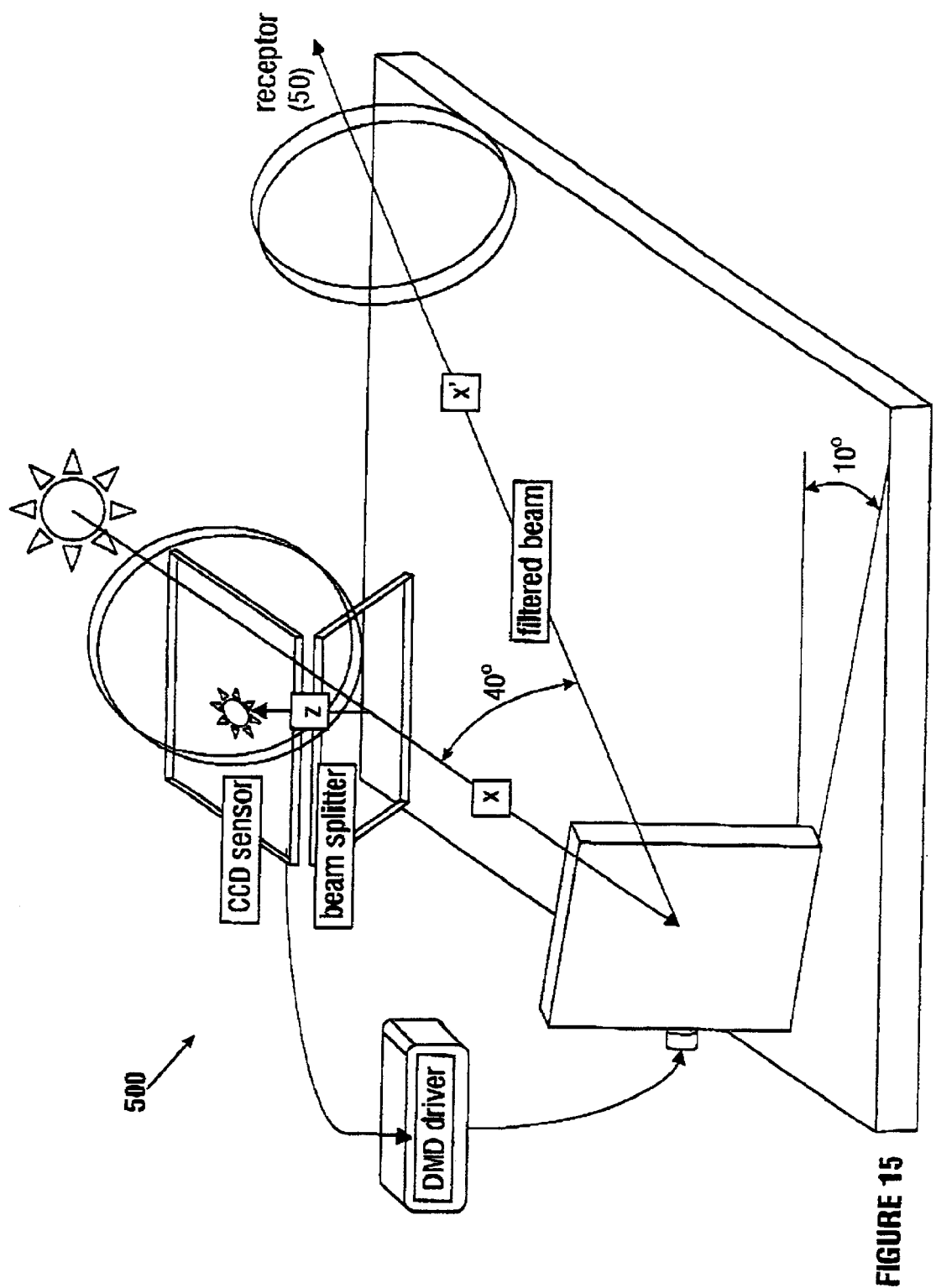
FIG. 15 is a second perspective view of the dynamic filtration system of FIG. 12 where the filtered beam is not parallel to the incoming light beam according to one embodiment of the invention.

In FIG. 15, the bright light source 40 may be filtered without using the mirror 216. In this embodiment, the filtered beam, x", is not parallel to the incoming beam, x. Instead, the filtered beam, x", is at a 40-degree angle from the incoming beam. The implementation of FIG. 15 may be acceptable where the filtered outgoing beam does not need to be parallel to the incoming beam.

In FIG. 14, according to one embodiment, tens 230 and 232 may be adapted in dimensions and optical characteristics to enhance the viewing angle of the image being received. The field of view and the corresponding viewing angle may impose dimensioning parameters that depend on the characteristics of these lenses 230 and 232. Where the field of view is close to its limits, a portion of the bright source 40 may not entirely be returned out of the system 500. Nevertheless, the bright light source 40 is effectively filtered before coming to the receptor 50, as desired.

Figure 16:
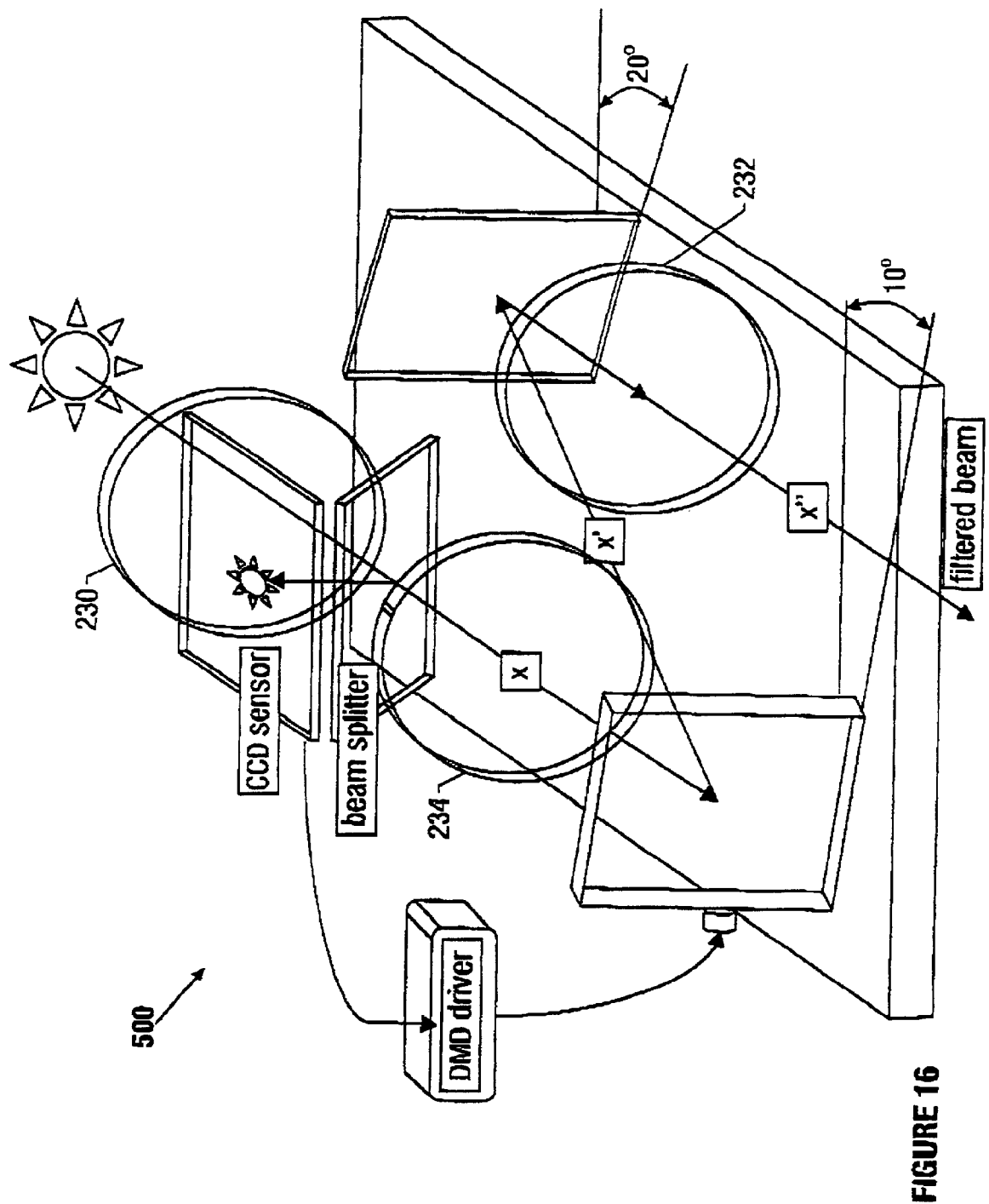
FIG. 16 is a third perspective view of the dynamic filtration system of FIG. 12 employing additional lenses according to one embodiment of the invention.

In order to have the CCD sensor 220 on the secondary image plane of the lens 230 and the DMD 210 on the primary image plane (see FIG. 3), according to one embodiment, the DMD 210 and CCD sensor 220 are positioned the same distance from the beamsplitter 218. However, in another embodiment, shown in FIG. 16, a third lens 234 is placed between the DMD 210 and the beamsplitter 218. The third lens 234 allows the CCD sensor 220 and the DMD 210 to not be equal distance from the beamsplitter 218.

In another embodiment, the DMD 210 itself acts as the beamsplitter as well as the bright light filter. Instead of including mirrors which oscillate between minus 10 and plus 10 degrees, according to one embodiment, a DMD 310 includes mirrors 312*a* and 312*b*, which oscillate between minus 20 degrees and plus 20 degrees, respectively, relative to the axis of the DMD 310. Although DMDs for projection are available with mirrors which oscillate in the plus and minus 10 degree direction, the DMDs may readily be adapted to any angle, as desired, for reflecting light toward a receptor or deflect light to a sensor, as described herein. However, existing DMD's working as described (±10°) might be preferred for cost/performance reasons. They would work as well, and would only impose lenses with longer focal length and/or other optical arrangements.

Figure 17:
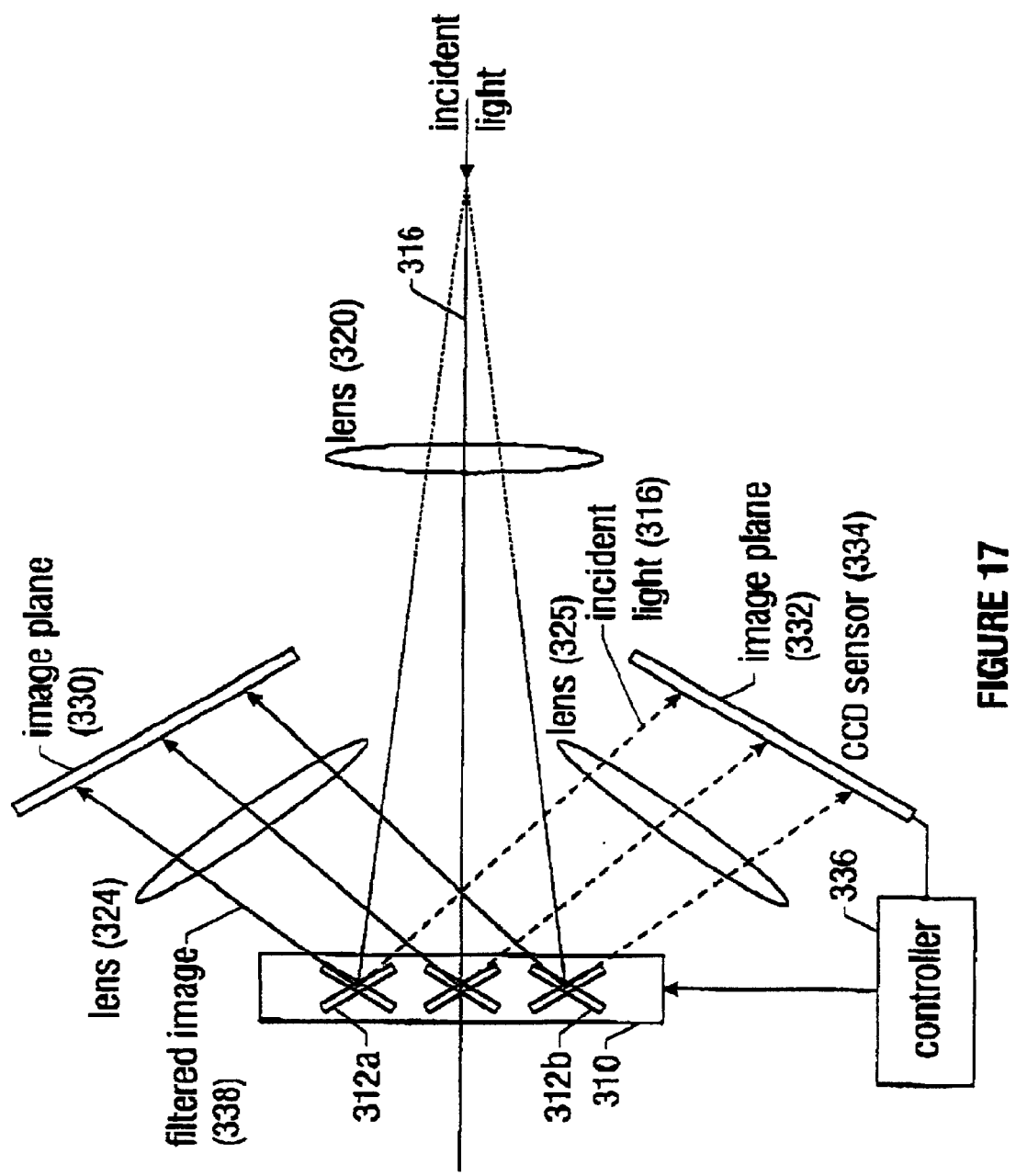
FIG. 17 is a diagram illustrating how a digital micromirror device may be used as both a beamsplitter and an active reflector according to one embodiment of the invention.

In FIG. 17, incident light 316 posses through lens 320 before reaching the DMD 310. The incident light 316 concentrates first on DMD 310 and then on either or both of image planes 330 and 332, depending on whether the mirrors 312*a* or the 312*b* are hit by the incident light 316. In one embodiment, the image plane 332 further comprises a CCD sensor 334. The CCD sensor 334 is coupled to a controller 336 which ultimately drives the DMD 310. In one embodiment, an oscillator controls the frequency and the relative percentage of light on image plane 330 and 332.

The image plane 330 receives a filtered image 338. Thus, a receptor may be placed in the image plane 330 or the filtered image may be deflected to a receptor at a different position relative to the image plane 330, such as by placement of mirrors (see the mirror 216 of FIG. 14).

In FIG. 17, incoming light passes through the lens 320 and focuses first on DMD 310, then alternatively on image plane 330 and image plane 332 The controller 336, upon receiving information from the CCD sensor 334, may selectively adjust the mirrors 312 of the DMD 310. This selective adjustment controls the relative quantity of light focusing on the image plane 330 and the image plane 332.

Thus, according to one embodiment, because the image plane 332 includes the CCD sensor 334, all of the incident light is deflected to the image plane 332. On the other hand, because the image plane 330 receives light intended for a receptor, the image plane 330 receives only filtered light. This means that some mirrors 312 oscillate, while others do not.

Figure 18:
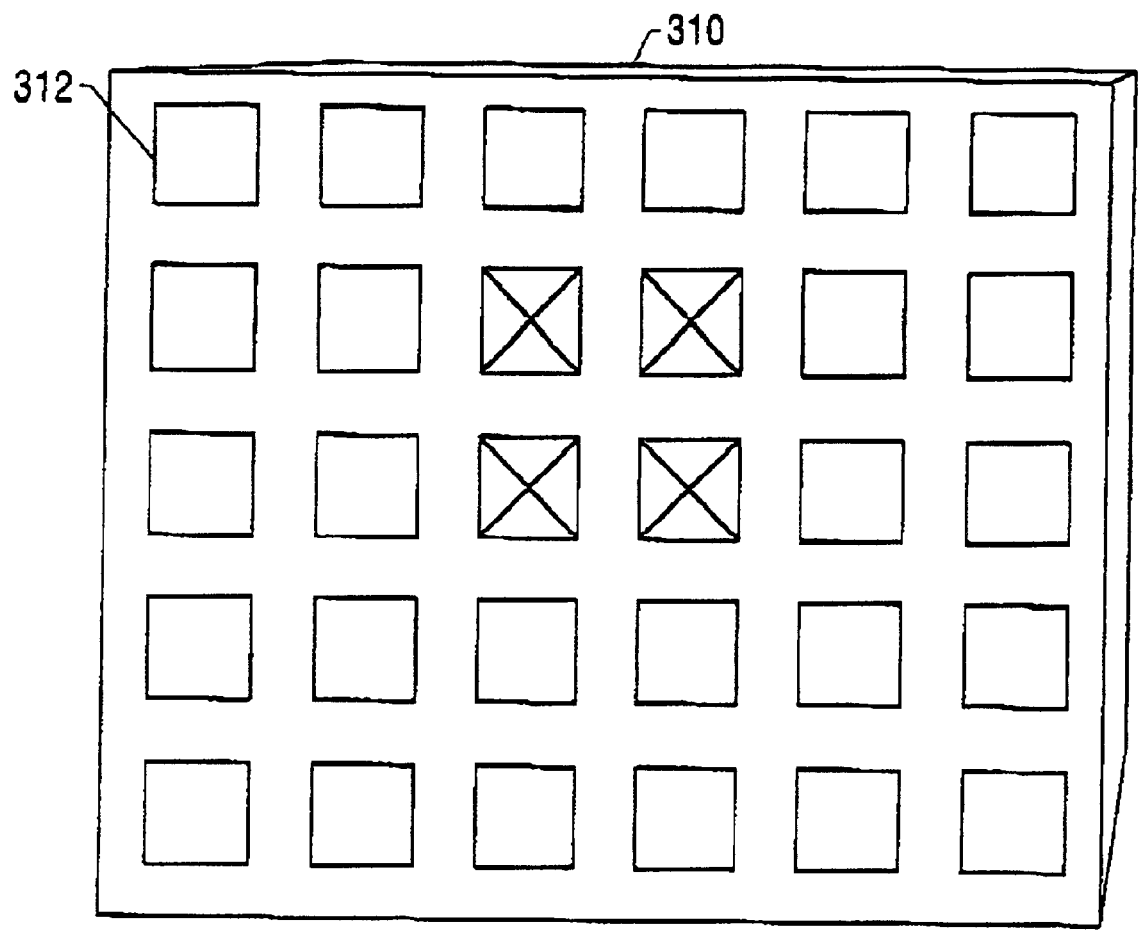
FIG. 18 is a block diagram of the digital micromirror device used to illustrate another embodiment of the invention.

FIG. 18 illustrates this point. The DMD 310 is comprised of the individual mirrors 312. Mirrors 312 that are marked with an "X" are saturated with bright light beyond a predetermined intensity level. The controller 336 thus determines that mirrors 312 marked with an "X" are to be rotated such that light received by them does not reach the image plane 330 (and, thus, reaches no receptor).

In one embodiment, the DMD 310 oscillates between positions 312a (−20 degrees) and 312b (+20 degrees). The mirrors 312 marked with an "X," however, do not oscillate, but, instead, remain in the 312b position, e.g., reflecting incident light 316 to the CCD sensor 334. The mirrors 312 which are not marked with an "X" oscillate as normal. In this manner, the light source received by the mirrors 312 marked with the "X" are not reflected to the receptor. Only the mirrors 312 that are saturated with the bright light source are rotated.

In another embodiment, the controller 336 operates a double oscillator (one oscillator plus a frequency divider, for example). The double oscillator provides both high frequency, or "active," oscillation and low frequency, or "passive" oscillation of the mirrors 312.

For example, when no bright light source is in sight, the low frequency oscillator controls all the mirrors 312 in one embodiment. Once a bright light source is in sight, the high frequency oscillator controls the mirrors 312 that "see" the bright light source, e.g., the "X" mirrors 312 in FIG. 18. Once the bright light source is no longer in sight, the active mirrors resume the low frequency oscillation. Thus, the high frequency oscillator controls the mirrors 312 that see the bright light source (the "X" mirrors) while the low frequency oscillator controls all the mirrors 312. Using this implementation, the light reflected toward the image plane 330 in FIG. 17 may be reduced, as needed, to filter the bright light source.

The low frequency/high frequency option of the DMD may depend on the characteristics of the application. For example, for a system built to counteract a laser beam, the high frequency oscillator may be replaced by maintaining the saturated mirrors to be oriented towards the CCD sensor 334 at all times.

As another consideration, to avoid a possible blurring of the image, during the low frequency oscillation of all of the mirrors 312, the mirrors 312 could be rotated in a random or patterned order. For example, in one embodiment, each mirror 312 is rotated once every low frequency period. In another embodiment, a group of mirrors 312 is rotated together. Every mirror 312 is turned towards the image plane 332 (to be received by the CCD sensor 334) once every low frequency period. In contrast, mirrors 312 are turned towards the image plane 330 (to be received by a receptor) for a longer period of time. The mirrors 312 are thus solicited much less often than if they'd been rotated an equal number of times in each direction.

The period of time may be determined experimentally to reduce the blurring of the image. Thus, for example, in a given low frequency period, the mirrors 312 may be rotated toward the CCD sensor 334 $\frac{1}{10}^{th}$ as long as toward the image plane 330 (the receptor). This variable asymmetrical rotation of the mirrors 312 may be desirable in some applications to adjust the sensitivity of the system.

As an alternative to DMD technology, a reflective liquid crystal display medium may be used to reflect incident light, as described in the embodiments of FIGS. 11–17, above. In contrast to the transmissive LCD matrix described in the system 100, reflective LCD material, such as is used for laptop displays and the like, may be manufactured with the characteristics of the DMD 210. Other reflective media may be substituted as well, in the embodiments described, to dynamically filter bright light sources intended for a receptor.

A dynamic filtration device may thus be constructed according to the several embodiments described herein to effectively block bright light sources from view. In some embodiments, where light intensity exceeds a predetermined value, a shading matrix may shade or block the light from being received by a receptor. In other embodiments, a DMD may deflect bright light sources away from the receptor.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for adjusting the opacity of a matrix comprising a plurality of cells, the method comprising:

receiving incident light intended for a receptor;

receiving the incident light into a beamsplitter;

refracting part of the incident light to a sensor;

identifying a portion of the incident light that exceeds a predetermined threshold intensity;

identifying a bright light source in the incident light;

identifying a direction of the bright light source;

identifying a direction of sight of the receptor;

determining an angle from the direction of the bright light source and the direction of sight of the receptor;

defining an active zone equivalent to a first predetermined range of angles associated with the direction of the bright light source and the direction of sight of the receptor;

defining a passive zone equivalent to a second predetermined range of angles associated with the direction of the bright light source and the direction of sight of the receptor;

determining whether the angle falls within the active zone or the passive zone; and adjusting the opacity of at least one cell of the matrix based on the identified portion, the identified bright light source, and the determination as to whether the angle falls within the active zone or the passive zone.

2. The method of claim 1, identifying a portion of the incident light that exceeds a predetermined threshold intensity further comprising:

associating a first intensity value to the incident light; and comparing the first intensity value to the predetermined threshold intensity.

3. A system comprising:

a light deflector to redirect incident light of an image being received by a dynamically moving receptor;

a first sensor to receive the redirected incident light, to track the intensity of the redirected incident light, and to track the direction of the image;

a second sensor to track a direction of sight of the receptor, wherein the direction of sight is a function of the dynamic movement of the receptor;

a matrix disposed between the light deflector and the receptor, the matrix comprising a plurality of cells, wherein the opacity of each of the cells may selectively be adjusted; and a controller coupled to the matrix, wherein the controller:
receives the intensity of the redirected incident light information and the direction of the image information from the first sensor;
receives the direction of sight information from the second sensor;
calculates an angle formed by the direction of the image information and the direction of sight information;
defines an active zone based on a predetermined range of values of the angle;
defines a passive zone based on a predetermined range of values of the angle;
determines if the angle corresponds to the active zone or the passive zone; and
adjusts the opacity of one or more cells of the matrix based upon the intensity of the redirected incident light information and whether the angle corresponds to the active zone or the passive zone.

4. The system of claim 3, wherein the matrix comprises a plurality of two-dimensional transmissive liquid crystal display cells.

5. The system of claim 3, wherein the first sensor comprises a plurality of photoreceptor cells.

6. The system of claim 3, wherein the controller comprises a processor-based system including a software program.

7. The system of claim 3, wherein the deflector comprises a beamsplitter.

8. The system of claim 7, wherein the beamsplitter passes about 90% of the incident light while deflecting about 10% of the incident light to the first sensor.

9. The system of claim 7, wherein the beamsplitter passes about 60% of the incident light while deflecting about 40% of the incident light to the first sensor.

10. The system of claim 7, wherein the beamsplitter passes about 50% of the incident light while deflecting about 50% of the incident light to the first sensor.

11. The system of claim 3, wherein the first sensor comprises a charge-coupled device located inside a camera body.

12. The system of claim 11, wherein the controller further includes parameter adjustment controls.

13. The system of claim 3, further comprising an adjustable lens which receives the incident light and focuses the incident light on the matrix.

14. A method of operating a general purpose data processor of known type to enable the data processor to execute an object program, wherein the object program stores a predetermined first range and a predetermined second range, wherein the object program uses inputs from a first sensor and a second sensor, wherein the object program controls a shading matrix comprising a plurality of cells, the method comprising the steps of:

receiving light intensity information and direction of light information from the first sensor;

receiving direction of sight information from the second sensor;

measuring a third angle from the direction of light information and the direction of sight information;

defining an active zone based on the predetermined first range;

defining a passive zone based on the predetermined second range;

determining whether the third angle is within the active or passive zone;

comparing the light intensity information to a predetermined threshold intensity value; and adjusting the opacity of one or more cells of the shading matrix based on the light intensity information as compared to the predetermined threshold intensity value and whether the third angle is within the active or passive zone.

15. A method for dynamic optical filtration of a matrix, said matrix comprising a plurality of cells, said method comprising:

identifying a source of bright light in incident light, said incident light to be received by a receptor wherein a direction of sight is associated with said receptor;

determining an angle between said source of bright light and said direction of sight;

defining an active zone range and passive zone range for said angle;

determining whether said angle is in said active zone or said passive zone; and adjusting the opacity of at least one cell in the matrix based whether said angle is within said active zone or said passive zone.

* * * * *